(12) United States Patent
Kokubo

(10) Patent No.: US 8,219,071 B2
(45) Date of Patent: Jul. 10, 2012

(54) PORTABLE TERMINAL, INFORMATION RECOMMENDATION METHOD AND PROGRAM

(75) Inventor: Takeshi Kokubo, Kanagawa (JP); Naoki Kokubo, legal representative, Kanagawa (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 1473 days.

(21) Appl. No.: 11/417,235

(22) Filed: May 4, 2006

(65) Prior Publication Data

US 2006/0271618 A1 Nov. 30, 2006

(30) Foreign Application Priority Data

May 9, 2005 (JP) ................................ 2005-136277

(51) Int. Cl.
*H04L 29/08* (2006.01)
(52) U.S. Cl. ............... 455/414.4; 455/414.1; 455/414.2; 455/414.3; 709/226; 709/229; 370/256; 370/333; 370/395.2; 370/395.3; 370/395.4
(58) Field of Classification Search .................. 370/252, 370/333, 395.2–395.4; 709/226, 229; 455/414.1–414.4
See application file for complete search history.

(56) References Cited

U.S. PATENT DOCUMENTS

| | | | | |
|---|---|---|---|---|
| 5,910,799 A * | 6/1999 | Carpenter et al. | ............ | 715/866 |
| 2003/0030666 A1 | 2/2003 | Najmi et al. | | |
| 2003/0032389 A1 * | 2/2003 | Kim et al. | ..................... | 455/3.01 |
| 2003/0093370 A1 * | 5/2003 | Choi | ................................ | 705/39 |
| 2003/0119562 A1 * | 6/2003 | Kokubo | ......................... | 455/566 |
| 2004/0043758 A1 * | 3/2004 | Sorvari et al. | ............... | 455/414.1 |
| 2004/0058702 A1 | 3/2004 | Schnabel | | |
| 2005/0054381 A1 * | 3/2005 | Lee et al. | ........................ | 455/557 |
| 2005/0066029 A1 | 3/2005 | Koo | | |
| 2006/0079201 A1 * | 4/2006 | Chung et al. | ................... | 455/410 |
| 2006/0156209 A1 | 7/2006 | Matsuura et al. | | |

FOREIGN PATENT DOCUMENTS

| | | |
|---|---|---|
| CN | 1429448 | 7/2003 |
| EP | 1 265 425 A1 | 12/2002 |
| EP | 1 324 573 A2 | 7/2003 |

(Continued)

OTHER PUBLICATIONS

English Translation of Chinese Office Action issued in corresponding Chinese Application No. 200610092677.3.
Extended European Search Report issued May 18, 2011 for corresponding European Application No. 06 11 3674.

(Continued)

*Primary Examiner* — Nimesh Patel
(74) *Attorney, Agent, or Firm* — Rader Fishman & Grauer, PLLC

(57) ABSTRACT

An information acquisition section acquires application halfway information, user preference, updated date and time, real-timeness, usage frequency, usage history, radio wave state, remaining battery level, billing information or other information. A controller calculates recommendation values indicating recommended degrees to recommend the use to a user for each of a plurality of applications and for each of the contents of each of the applications, using the information that the information acquisition section acquired. Then, for example, when a specific button is pressed, the controller gives priorities to the plurality of applications and contents based on the recommendation values, causing the applications and contents to be displayed on a display of a display section 15 in the order of priority. Thus, of the various applications and contents, it makes it possible to select one that is more matched to the user preference and suitable for the terminal usage pattern.

20 Claims, 16 Drawing Sheets

FOREIGN PATENT DOCUMENTS

| | | |
|---|---|---|
| JP | 2000-029892 | 1/2000 |
| KR | 20050028610 A | 3/2005 |
| WO | WO-2004/077291 A1 | 9/2004 |
| WO | WO-2004/086211 A1 | 10/2004 |

OTHER PUBLICATIONS

Korean Office Action issued Apr. 19, 2012 for the corresponding Korean Application No. 10-2006-0040665.

* cited by examiner

FIG. 5

| # | APPLICATION | CONTENTS c1 | CONTENTS c2 (DETAILS) | EXAMPLE OF XXX AND YYY OF CONTENTS c2 |
|---|---|---|---|---|
| 1 | MAIL | CONFIRM UNOPENED MAIL<br>CREATE DRAFT MAIL<br>MAIL REPLAY<br>CREATE NEW MAIL | CONTENTS c1 FROM/TO XXX | XXX IS THE MAIL ADDRESS AND NAME PULLED FROM THE ADRESS BOOK |
| 2 | TELEPHONE | CONFIRM ANSWERING MACHINE<br>CALL BACK<br>NEW COMMUNICATION | CONTENTS c1 FROM/TO XXX | XXX IS THE MAIL ADDRESS AND NAME PULLED FROM THE ADRESS BOOK |
| 3 | MOVING IMAGE VIEWER | VIEW MOVING IMAGE<br>DL MOVING IMAGE | VIEW MOVING IMAGE OF XXX<br>DL MOVING IMAGE OF YYY | XXX IS THE FILE NAME<br><br>YYY IS THE SITE ADDRESS |
| 4 | STILL IMAGE VIEWER | VIEW STILL IMAGE<br>DL STILL IMAGE | VIEW STILL IMAGE OF XXX<br>DL STILL IMAGE OF YYY | XXX IS THE FILE NAME<br><br>YYY IS THE SITE ADDRESS |
| 5 | GAME | PLAY GAME<br>DL GAME | PLAY GAME OF XXX<br>DL GAME AT YYY | XXX IS THE GAME TITLE<br><br>YYY IS THE GAME DL SITE |
| 6 | TV | VIEW TV<br>RECORD TV | CONTENTS c1 ON XXX | XXX IS THE TV PROGRAM |
| 7 | WEB | BROWSE HOME PAGE | CONTENTS c1 AT XXX | XXX IS THE SITE ADDRESS |
| 8 | SCHEDULE | SYNCHRONIZE SCHEDULE<br>CONFIRM SCHEDULE | SYNCHRONIZE WITH XXX<br>CONFIRM SCHEDULE OF YYY | XXX IS THE NAME OF DEVICE CONNECTABLE ON BT, ETC.<br>YYY IS TODAY, THIS WEEK, THIS MONTH, ETC. |
| 9 | TERMINAL SETTING CHANGE | CHANGE RINGTONE<br>CHANGE WALLPAPER | CONTENTS c1 TO XXX | XXX IS THE FILE NAME |
| 10 | MUSIC PLAYER | LISTEN TO MUSIC<br>DL MUSIC | LISTEN TO MUSIC OF XXX<br>DL MUSIC AT YYY | XXX IS THE FILE NAME<br><br>YYY IS THE SITE ADDRESS |
| 11 | SYNCHRONOUS | SYNCHRONIZE CONTENT<br>SYNCHRONIZE SCHEDULE | SYNCHRONIZE XXX AND YYY | XXX IS THE NAME OF DEVICE CONNECTABLE ON BT, ETC.<br>YYY IS THE CONTENT OR SCHEDULE |

FIG.6

| CATEGORY | CATEGORY VALUE | EXPLANATION (ADVANTAGE) |
|---|---|---|
| HALFWAY | A | REFLECT THE REQUEST TO TERMINATE THE HALFWAY THROUGH |
| UPDATED DATE AND TIME | B | REFLECT THE PREFERENCE TOWARD NEWNESS |
| REAL-TIMENESS | C | REFLECT THE REQUEST FOR IMMEDIACY |
| HISTORY | D | REFLECT THE REQUEST FOR CONTINUOUS USE |
| FREQUENCY | E | REFLECT THE REQUEST FOR CUSTOMARY USE |
| KEYWORD | F | REFLECT THE REQUEST FOR PREFERENCE |

FIG.7

| KEYWORD | KEYWORD COEFFICIENT (FOR F CALCULATION) |
|---|---|
| NEWS | 0 |
| SPORTS | 0 |
| FRIEND u | 0 |
| ARTIST a | 0 |

FIG. 8

| APPLICATION | KEYWORD | REAL-TIMENESS COEFFICIENT (FOR C CALCULATION) |
|---|---|---|
| TV | NEWS | 4 |
| | SPORTS | 6 |
| | FRIEND u | 0 |
| | ARTIST a | 0 |
| MOVING IMAGE VIEWER | NEWS | 0 |
| | SPORTS | 0 |
| | FRIEND u | 0 |
| | ARTIST a | 0 |
| MAIL | NEWS | 0 |
| | SPORTS | 0 |
| | FRIEND u | 0 |
| | ARTIST a | 0 |
| MUSIC PLAYER | NEWS | 0 |
| | SPORTS | 0 |
| | FRIEND u | 0 |
| | ARTIST a | 0 |
| WEB | NEWS | 0 |
| | SPORTS | 0 |
| | FRIEND u | 0 |
| | ARTIST a | 0 |

FIG. 9

| KEYWORD | KEYWORD COEFFICIENT (FOR F CALCULATION) |
|---|---|
| NEWS | 2 |
| SPORTS | 0 |
| FRIEND u | 3 |
| ARTIST a | 1 |

FIG.10

| APPLICATION | KEYWORD | REAL-TIMENESS COEFFICIENT (FOR C CALCULATION) |
|---|---|---|
| TV | NEWS | 5 |
| | SPORTS | 6 |
| | FRIEND u | 0 |
| | ARTIST a | 0 |
| MOVING IMAGE VIEWER | NEWS | 0 |
| | SPORTS | 0 |
| | FRIEND u | 0 |
| | ARTIST a | 0 |
| MAIL | NEWS | 0 |
| | SPORTS | 0 |
| | FRIEND u | 2 |
| | ARTIST a | 0 |
| MUSIC PLAYER | NEWS | 0 |
| | SPORTS | 0 |
| | FRIEND u | 0 |
| | ARTIST a | 1 |
| WEB | NEWS | 0 |
| | SPORTS | 0 |
| | FRIEND u | 0 |
| | ARTIST a | 0 |

FIG.11

| | HALFWAY Wa | UPDATED DATE AND TIME Wb | REAL-TIMENESS Wc | HISTORY Wd | FREQUENCY We | KEYWORD Wf |
|---|---|---|---|---|---|---|
| WEIGHT | 10 | 6 | 8 | 1 | 8 | 8 |

FIG.12

| CONTENTS/ APPLI | HALFWAY A | UPDATED DATE AND TIME B | REAL-TIMENESS C | HISTORY D | FREQUENCY E | KEYWORD F | R |
|---|---|---|---|---|---|---|---|
| MAIL | 0 | 9 | 8 | 1 | 8 | 8 | 247 |
| Wx*X | 0 | 54 | 64 | 1 | 64 | 64 | |
| GAME | 10 | 6 | 0 | 8 | 2 | 6 | 208 |
| Wx*X | 100 | 36 | 0 | 8 | 16 | 48 | |
| MUSIC PLAYER | 0 | 10 | 0 | 0 | 0 | 8 | 124 |
| Wx*X | 0 | 60 | 0 | 0 | 0 | 64 | |
| SCHEDULE | 0 | 8 | 0 | 2 | 5 | 4 | 122 |
| Wx*X | 0 | 48 | 0 | 2 | 40 | 32 | |
| TV | 0 | 0 | 1 | 0 | 0 | 9 | 80 |
| Wx*X | 0 | 0 | 8 | 0 | 0 | 72 | |

FIG.13

| CONTENTS/APPLI | HALFWAY A | UPDATED DATE AND TIME B | REAL-TIMENESS C | HISTORY D | FREQUENCY E | KEYWORD F | R |
|---|---|---|---|---|---|---|---|
| CONFIRM UNOPENED MAIL OF FRIEND u Wx*X | 0 | 9 | 8 | 1 | 8 | 8 | 247 |
| RECENTLY DLED GAME Wx*X | 0 | 54 | 64 | 1 | 64 | 64 | 208 |
| LISTEN TO NEW MUSIC Wx*X | 10 | 6 | 0 | 8 | 2 | 6 | |
| | 100 | 36 | 0 | 8 | 16 | 48 | 124 |
| SYNCHRONIZE PC AND SCHEDULE Wx*X | 0 | 10 | 0 | 0 | 0 | 8 | |
| | 0 | 60 | 0 | 0 | 0 | 64 | 122 |
| VIEW DRAMA d Wx*X | 0 | 8 | 0 | 2 | 5 | 4 | |
| | 0 | 48 | 0 | 2 | 40 | 32 | 80 |
| | 0 | 0 | 1 | 0 | 0 | 9 | |
| | 0 | 0 | 8 | 0 | 0 | 72 | |

FIG. 14

| CONTENTS/APPLI | HALFWAY<br>A | UPDATED DATE AND TIME<br>B | REAL-TIMENESS<br>C | HISTORY<br>D | FREQUENCY<br>E | KEYWORD<br>F | RADIO-WAVE/ACCESS STATE<br>G | REMAINING BATTERY LEVEL<br>H | BILLING STATE<br>I | R |
|---|---|---|---|---|---|---|---|---|---|---|
| MAIL | 0 | 9 | 8 | 1 | 8 | 8 | 1 | 1 | 1 | 247 |
| Wx*X | 0 | 54 | 64 | 1 | 64 | 64 | 1 | 1 | 1 | |
| GAME | 10 | 6 | 0 | 8 | 2 | 6 | 1 | 1 | 0 | 0 |
| Wx*X | 100 | 36 | 0 | 8 | 16 | 48 | 1 | 1 | 0 | |
| MUSIC PLAYER | 0 | 10 | 0 | 0 | 0 | 8 | 1 | 1 | 1 | 124 |
| Wx*X | 0 | 60 | 0 | 0 | 0 | 64 | 1 | 1 | 1 | |
| SCHEDULE | 0 | 8 | 0 | 2 | 5 | 4 | 0 | 1 | 1 | 0 |
| Wx*X | 0 | 48 | 0 | 2 | 40 | 32 | 0 | 1 | 1 | |
| TV | 0 | 0 | 1 | 0 | 0 | 9 | 1 | 0 | 1 | 0 |
| Wx*X | 0 | 0 | 8 | 0 | 0 | 72 | 1 | 0 | 1 | |

PORTABLE TERMINAL, INFORMATION RECOMMENDATION METHOD AND PROGRAM

CROSS REFERENCES TO RELATED APPLICATIONS

The present invention contains subject matter related to Japanese Patent Application JP 2005-136277 filed in the Japanese Patent Office on May 9, 2005, the entire contents of which being incorporated herein by reference.

BACKGROUND OF THE INVENTION

1. Field of the Invention

The present invention relates to a portable terminal equipped with a plurality of applications, an information recommendation method and program.

2. Description of the Related Art

A recent mobile phone terminal is equipped with various applications such as, for example, email applications, electronic game applications, music player applications, scheduling applications, and television viewing applications. The number and types of applications loaded on the mobile phone terminal is likely to be further increased.

Incidentally, for example, disclosed in Japanese Patent Publication Laid-Open No. 2000-29892 (Patent Document 1) is a recommend system which makes it possible to select and provide a content suitable for a user preference by searching multimedia information corresponding to a keyword extracting from a profile of the user from a memory section where the multimedia information and the content tags to which keywords related to each piece of the multimedia information are added.

[Patent Document 1] JP-A No. 2000-29892 (FIG. 1)

SUMMARY OF THE INVENTION

The mobile phone terminal is generally used with a specific purpose such as, for example, telephone calls or email transmission. However, it is often used for the user to kill time, for example, waiting for a train or waiting for someone.

In the case of the use for killing time, the user selects and executes any of the various applications loaded on the mobile phone terminal. However, the user is often unsure which application to select, when selecting an application without having a specific purpose.

Further, general users rarely perfectly understand the existences and usage methods of all the applications loaded on the mobile phone terminal. Thus, the users use the limited applications that they know the existences and usage methods, so that the users may often reduce the options by themselves.

Further, some applications include many different contents. In this case also, similarly to the above described case of the application selection, the users may be unsure which content to select, or may be even impossible to select the contents the users do not know.

Meanwhile, as disclosed in the above described JP-A No. 2000-29892, it is thought to use the technology for selecting a content suitable for the user preference. However, this technology only provides the content selection based on keywords. Thus, for example, when the technology is applied to a portable terminal which is used in a particular usage pattern and usage environment with various applications loaded thereon, such as a mobile phone terminal, it is difficult to say that the selection is carried out in accordance with the terminal usage pattern and the like, being more matched to the user preference.

The present invention is proposed in light of such circumstances, and it is desirable to provide a portable terminal, information presentation method and program which makes it possible to select not only an application but also a content more matched to the user preference, for example, among various applications, as well as allowing the selection in accordance with the terminal usage pattern and the like.

A portable terminal according to an embodiment of the present invention has: a recommendation calculation section for calculating recommendation values indicating recommended degrees to recommend the use to a user for each of at least a plurality of applications; an information acquisition section for acquiring predetermined basic information used for calculating the recommendation values, for each of the applications; a prioritization section for giving priorities to the plurality of applications based on the recommendation values; and a presentation section for presenting the applications to the user in the order of priority, thereby to solve the above described problem.

Further, in the portable terminal according to the embodiment of the invention, the recommendation calculation section places each of the applications in the upper hierarchy, and calculates the recommendation values for each of the applications and for each of the contents of the respective applications, wherein the contents are in the lower hierarchy relative to the respective applications. The information acquisition section acquires the predetermined basic information for each of the hierarchized applications and each of the contents of the respective applications. The prioritization section gives priorities to each of the plurality of applications and each of the contents of the respective applications based on the recommendation values. The presentation section presents the applications and the contents of the respective applications to the user, in the order of priority.

Further, an information recommendation method according to an embodiment of the present invention has the steps of: acquiring predetermined basic information used for calculating recommendation values indicating recommended degrees to recommend the use to a user by the information acquisition section, for each application; calculating the recommendation values by the recommendation calculation section, using the basic information; giving priorities to a plurality of applications by the prioritization section, based on the recommendation values; and presenting the applications to the user by the presentation section in the order of priority, thereby to solve the above described problem.

Further, an information recommendation program according to an embodiment of the present invention causes the portable terminal to function as: a recommendation calculation section for calculating recommendation values indicating recommended degrees to recommend the use to the user, for each of at least a plurality of applications; an information acquisition section for acquiring predetermined basic information used for calculating the recommendation values, for each of the applications; a prioritization section for giving priorities to the plurality of applications based on the recommendation values; and a presentation section for presenting the applications to the user in the order of priority, thereby to solve the above described problem.

In other words, according to the embodiment of the invention, the recommended degrees to recommend the use to a user are determined for each of at least a plurality of applications, and the priorities are given to each of the applications depending on their recommended degrees. Further, according to the embodiment of the invention, the basic information used in the calculation for determining the recommended degrees includes, for example, application halfway information, user preference, updated date and time, real-timeness, usage frequency, usage history, radio wave state, remaining battery level, and billing information.

According to the embodiment of the invention, for example, using the application halfway information, user preference, updated date and time, real-timeness, usage frequency, usage history, radio wave state, remaining battery level, and billing information, the recommended degrees to recommend the use to the user are determined for each of at least a plurality of applications to give the priorities to at least each of the applications depending on their recommended degrees, thus this makes it possible to select not only an application but also a content more matched to the user preference, for example, among various applications, as well as allowing the selection in accordance with the terminal usage pattern and the like.

BRIEF DESCRIPTION OF THE DRAWINGS

Embodiments of the present invention will be described in detail based on the following figures, wherein:

FIG. 5 is a view used for the description of the application hierarchy, contents c1 hierarchy, and contents c2 hierarchy;

FIG. 6 is a view used for the description of categories related to a user preference;

FIG. 7 is a view showing a keyword example in "Keyword Category" and an example of keyword coefficients;

FIG. 8 is a view showing a keyword example in "Real-Timeness Category" for each application and an example of real-timeness coefficients;

FIG. 9 is a view showing a keyword example in a certain application of "Real-Timeness Category" and an example of real-timeness coefficients;

FIG. 10 is a view showing a keyword example for each application in "Real-Timeness Category" after a coefficient update is carried out, and an example of real-timeness coefficients;

FIG. 11 is a view showing an example of weighted coefficients in each of the categories related to the user preference;

FIG. 12 is a view showing an example of category values and weighted coefficients for each of the applications related to the user preference, and an example of recommendation values calculated using the category values and weighted coefficients;

FIG. 13 is a view showing an example of category values and weighted coefficients across the hierarchies of the application and contents related to the user preference, and an example of recommendation values calculated using the category values and weighted coefficients;

FIG. 14 is a view showing an example of category values and weighted coefficients for each of the applications related to the user preference and the application use condition, and an example of recommendation values calculated using the category values and weighted coefficients;

DETAILED DESCRIPTION OF THE PREFERRED EMBODIMENT

Figure 1:
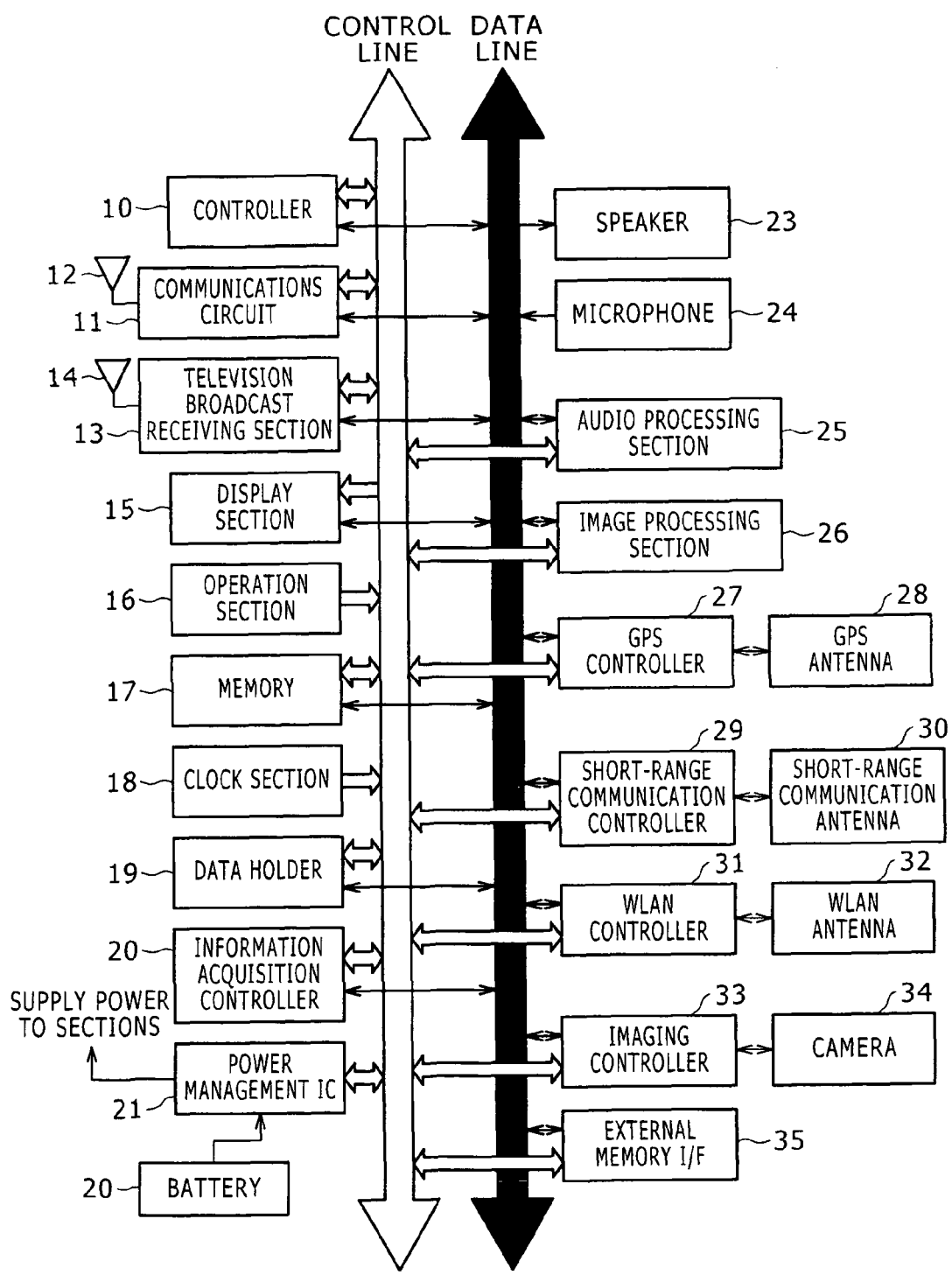
FIG. 1 is a block diagram showing the general internal circuit configuration of a mobile phone terminal according to an embodiment of the present invention.

Hereinafter, a portable terminal, a control method and control program thereof according to an embodiment of the present invention will be described with reference to the accompanying drawings.

Incidentally, a mobile phone terminal is exemplified as an example of a portable terminal according to the embodiment of the invention, but the content described herein is only an example, and it is needless to say that the invention is not limited to this example.

[General Description]

A mobile phone terminal according to the embodiment of the invention includes a function for displaying available applications and contents on a display in the priority order of recommendation to a user, upon detecting that a specific hard key or soft key (hereinafter, denoted as a "specific button" in the embodiment) is pressed by the user.

Herein, although the details will be described later, the embodiment is designed to define priorities for a plurality of applications and contents based on the user preference and the application use condition (use environment). There are various types of information used for giving priorities to the applications and contents, such as, for example, halfway information of the applications and contents; updated date and time information of the applications and contents, real-timeness information of the applications and contents, execution history information of the applications and contents, usage frequency information of the applications and contents, keywords included in the applications and contents, radio wave state information of the mobile phone terminal, remaining battery level information of the mobile phone terminal, and billing information for telephone calls and application/content downloads.

More specifically, it is designed as follows: These pieces of information are roughly grouped into a category on the user preference and a category on the application use condition. The category on the user preference is further divided into, for example, a category representing the application and content halfway through (hereinafter denoted as "Halfway Category"), a category representing the updated date and time of the application and content (hereinafter denoted as "Updated Date and Time Category"), a category representing the real-timeness of the application and content (hereinafter denoted as "Real-Timeness Category"), a category representing the execution history of the application and content (hereafter denoted as "History Category"), a category representing the usage frequency of the application and content (hereinafter denoted as "Frequency Category"), and a category representing the keywords included in the application and content (hereafter denoted as "Keyword Category"). The category on the application use condition is further divided into, for example, a category representing the radio-wave and access state (hereinafter denoted as "Radio-Wave/Access State Category"), a category representing the remaining battery level of the mobile phone terminal (hereinafter denoted as "Battery Level Category"), and a category representing the billing state for mobile phone terminal use and application/content downloads (hereinafter denoted as "Billing State Category"). The calculation is carried out by calculation formulas described below using the information on the subdivided categories as predetermined basic information, thereby to define priorities for the applications and contents based on the values determined by the calculation.

In other words, the value calculated using the information on each of the categories as the basic information is the value for calculating the application and content to be recommended to the user. The value will be denoted as a recommendation value R in the following description.

Further, in the embodiment of the invention, the calculation of the recommendation value R using the basic information is carried out, for example, at predetermined time intervals, or when the "specific button" is pressed, or when a predetermined event occurs.

[General Internal Configuration of Mobile Phone Terminal]

FIG. 1 shows the general internal configuration of a mobile phone terminal of the embodiment, where the above described functions can be executed.

A communication antenna 12, for example a built-in antenna, carries out transmission and reception of signal waves for telephone calls and packet communication. A communications circuit 11 carries out frequency conversion, modulation and demodulation of the transmission/reception signals. Incidentally, data sent and received by the packet communication includes email data, image data of moving images and still images, audio data, HTML (Hyper Text Markup Language) data, program data and other various data. Assuming the received data of the communication antenna 12 and communications circuit 11 is telephone voice data, the telephone voice data is sent to an audio processing section 25 via a data line, while the other received data are once sent to a controller 10 and then sent to each section from the controller 10 according to the necessity. Further, in the embodiment, the communications circuit 11 includes a section (radio wave state measuring circuit) for measuring information on the radio wave state, such as, for example, the RSSI (Receive Signal Strength Indicator), the CPICH (Common Pilot Channel), Ec/Io (the transmission level of the pilot channel at the neighboring base station/the sum of all the transmission levels at the current base station and the neighboring base station) and CPICH RSCP (Received Signal Code Power) in WCDMA, and it is designed to send the measurement information to the controller 10 and an information acquisition controller 20.

A television antenna 14 receives television broadcast waves. A television broadcast receiving section 13 applies decoding and the like to the television broadcast signals received by the television broadcast antenna 14. Incidentally, in the embodiment, the television broadcasting may be terrestrial analog broadcasting or digital television broadcasting. The television image data received by the television antenna 14 and the television broadcast receiving section 13 is sent to an image processing section 26 via the data line, and the audio data is sent to the audio processing section 25 via the data line. Further, in the embodiment, the television broadcast receiving section 13 also includes a function for sending various types of information related to the television broadcast reception, such as, for example, information on the received channel and its switching, information on the start and end of reception, and EPG (Electronic Program Guide), to the controller 10 and the information acquisition controller 20.

A GPS (Global Positioning System) controller 27 receives radio waves emitted by a geodetic satellite in the GPS via a GPS antenna 28, and determines the degrees of longitude and latitude of a current position of the own terminal based on the received waves. Incidentally, the GPS is a system that receives radio waves emitted by a total of 24 geodetic satellites (NAVSTARs) the US Defense Department launched, to know the position (latitude/longitude degrees) of the receiving terminal on Earth. The GPS signal (information indicating the longitude and latitude degrees) that the GPS controller 27 received via the GPS antenna 28 is sent to the controller 10 and the information acquisition controller 20. In the embodiment, the GPS controller 27 further includes a section (radio wave state measuring circuit) for measuring the radio wave state of the GPS signal, as well as a function for sending the GPS related information, such as the measured value of the radio wave state, to the controller 10 and the information acquisition controller 20, together with the information indicating the start and end of the received GPS signal and positioning.

A short-range communication controller 29 and a short-range communication antenna 30 are the devices for carrying out short-range wireless communication of, for example, the so-called BlueTooth system. Incidentally, the BlueTooth system is the standardized proximity communication system for carrying out digital wireless communication in the 2.4 GHz zone. With the BlueTooth system, an adhok network is formed in the communication range of about 10 m between intercommunicating devices. Further, in the network of the BlueTooth system, one of the intercommunicating devices is set to a master and the other is set to a slave. The device previously set to the master searches the slave device through a response to a connection inquiry, and registers the slave device as a communication target. In the short-range communication by the short-range communication controller 29 and the short-range wireless communication antenna 30, various types of data such as image and audio data and program data are sent and received. The data received by the short-range wireless communication is once held in a data holder 19 under the control of the controller 10, and then is read out from the data holder 19 according to the necessity. In the embodiment, the short-range communication controller 29 further includes a section (radio wave state measuring circuit) for measuring the radio wave state of the BlueTooth signal, as well as a function for sending information related to the short-range communication, such as information indicating the start and stop of the communication destination device and communication, communication data volume, communication data format information and the measured value of the radio wave state, to the controller 10 and the information acquisition controller 20.

A WLAN (Wireless Local Area Network) controller 31 and a WLAN antenna 32 are the devices for carrying out wireless communication of a wireless LAN system that is standardized, for example, to the IEEE (the Institute of Electrical and Electronic Engineers) 802.11b or IEEE 802.11a. In the wireless communication by the WLAN controller 31 and the WLAN antenna 32, various types of data such as image and audio data and program data are sent and received. The data received by the WLAN is once held in the data holder 19 and then is read out from the data holder 19 according to the necessity. In the embodiment, the WLAN controller 31 further includes a section (radio wave state measuring circuit) for measuring the radio wave state of the WLAN signal, as well as a function for sending information related to the WLAN communication, such as information indicating the start and stop of the communication destination device and communication, communication data volume, communication data format information, and the measured value of the radio wave state, to the controller 10 and the information acquisition controller 20.

A camera 34 includes a lens system and an imaging element, and takes images under the control of an imaging controller 33. The imaging controller 33 defines basic parameters for the image taking, such as film valid pixels (the number of pixels), shutter speed and exposure, thereby to control image taking with the camera 34 based on the parameters. The image data acquired by the image taking with the camera 34 is sent via the data line to the image processing section 26, where the image data is subjected to a developing process and a conversion process to a predetermined image format. Then, under the control of the controller 10, the processed data is once held in the data holder 19 and read out from the data holder 19 according to the necessity. In the embodiment, the imaging controller 33 further includes a function for sending information related to the image taking, such as the parameters for the start of and during the image taking, to the controller 10 and the information acquisition controller 20.

An external memory interface (I/F) 35 carries out processes involved in writing/reading of data to an external memory, under the control of the controller 10, for example when the removable external memory is loaded to a memory slot not shown of the mobile phone terminal of the embodiment. Incidentally, in the embodiment, the external memory can store, for example, compressed moving and still image data, compressed audio data (music data, etc.), program data, and other various data. Under the control of the controller 10, the data stored in the external memory is read out through the external memory interface 35. Incidentally, for example, when the data read out from the external memory are moving and still image data, the moving and still image data are sent to the image processing section 26 via the data line. When the data read out from the external memory is the audio data, the audio data is sent to the audio processing section 25 and the other data are sent to the controller 10. In the embodiment, the external memory interface 35 further includes a function for sending information related to the external memory, such as writing and reading of data, data volume, and data format, to the controller 10 and the information acquisition controller 20.

The audio processing section 25, when supplied with received data of telephone voice from the communication antenna 12 and the communications circuit 11, decodes the received data of the telephone voice and sends the decoded telephone voice data to a speaker 23 via the data line. When supplied with received data of television sound from the television antenna 14 and the television broadcast receiving section 13, the audio processing section 25 carries out a reproduction process involved in decoding the received data of the television sound, and sends the television sound data after the reproduction process to the speaker 23 via the data line. Further, when supplied with the compressed and coded audio data that is read out from the external memory of the external memory interface 35 or the built-in memory, the audio processing section 25 carries out a reproduction process involved in decompressing and decoding the compressed and coded data, and sends the television sound data after the reproduction process to the speaker 23 via the data line. In addition, when supplied with the audio data read out from the data holder 19, the audio processing section 25 carries out a reproduction process in accordance with the format of the audio data, and sends the audio data after the reproduction process to the speaker 23 via the data line. Incidentally, the audio processing section 25 can also carry out a process of correcting voice and music and the like and outputting the corrected data to the speaker 23, based on different tone control values (e.g. sound volume, equalizing) set by the controller 10. In the embodiment, the audio processing section 25 further includes a function for sending information related to the audio processing, such as the start of audio data process, audio data volume, and audio data format, to the controller 10 and the information acquisition controller 20.

The speaker 23 is provided in the mobile phone terminal to function as a reception speaker and a speaker for ringer (ringtone), music reproduction, television sound reproduction, and alarm output. The speaker 23 includes a digital/analog converter and an amplifier, and outputs the data of telephone voice, ringtone, and television sound, after digital/analog converting and amplifying the data. This makes it possible to acquire the telephone voice, ringer tone, reproduced music, and television sound.

A microphone 24 is equivalent to a telephone transmitter, including an analog/digital converter and an amplifier. Telephone voice signal input via the microphone 24 is amplified by the amplifier to a predetermined level, converted to digital voice data by the analog/digital converter, and is sent via the data line to the audio processing section 25 where the digital voice data is coded. The coded data is sent to the communications circuit 11 via the data line, subjected to various processes involved in modulation and frequency conversion, and then the processed data is sent from the communication antenna 12.

The image processing section 26, when supplied with the television image data from the television broadcast receiving section 23, carries out a reproduction process of the image, and sends the television image data after the reproduction process to a display section 15 via the data line. When supplied with the compressed and coded image data that is read out from the built-in memory or the external memory of the external memory interface 35, the image processing section 26 carries out a reproduction process involved in decompressing and decoding the image data, and sends the decompressed and decoded image data to the display section 15 via the data line. In addition, when supplied with the image data read out from the data holder 19, the image processing section 26 carries out a reproduction process in accordance with the format of the image data, and sends the image data after the reproduction process to the display section 15 via the data line. Incidentally, the image processing section 26 corrects the image based on various types of image quality adjustment values (e.g. white balance, brightness, contrast, gamma correction), and then outputs the corrected data to the display section 15. In the embodiment, the image processing section 26 further includes a function for sending information related to the image processing, such as the start of image data process, image data volume, and image data format, to the controller 10 and the information acquisition controller 20.

The display section 15 includes a liquid crystal display or other display device and a display drive circuit to the display, and displays images and television images on the display.

An operation section 16 has different keys such as a numeric pad, a start key, a clear key, an end/power key, a silent key, and a memo key, as well as a jog dial part or an arrow key, and an operation signal generating section for generating operation data according to the operations of the keys. Incidentally, when the "specific button" of the embodiment is a hard key, the operation section 16 also includes the hard key. The operation data that the operation signal generating section of the operation section 16 generated is sent to the controller 10 and the information acquisition controller 20.

A clock section 18 includes: a clock function for generating information on year, month, date, time and the like; a timer function for measuring a predetermined time interval; and a function for setting the time, time interval and alarm time that the user desires, or other functions. The time information the clock section 18 generated is sent to the controller 10 and the information acquisition controller 20.

A battery 22, for example, is a removable secondary battery. A power management IC 21 converts electric power from the battery 22 into an adequate value and supplies it to the sections. In the embodiment, the power management IC 21 further includes a function for sending the remaining amount information of the battery 22 to the controller 10 and the information acquisition controller 20.

A memory 17 includes a ROM (Read Only Memory) and a RAM (Random Access Memory). The ROM stores an OS (Operating System), control programs for the controller 10 to control the sections, various initial setting values, font data, dictionary data, ringtone and key operation sound, announcing sound data for alarm, program code for applications for carrying out email creation and editing and the like, program code for applications for carrying out various processes to images and audio, program code for electronic game applications, control program codes for the controller 10 and the information acquisition controller 20 to realize the recommendation function of applications and contents to the user according to the embodiment, program codes for other various applications loaded on the mobile phone terminal, and identification information (ID) of the relevant mobile phone terminal. The ROM includes a rewritable ROM like the so-called NAND-type flash memory, which is designed to be able to store email data, telephone directory and email addresses set by the user, user schedule data; image data, downloaded image data and music data, downloaded ringtone, announcing sound data, character data, registration data of candidate words of forecast conversion, and learning data of forecast conversion, or other various user set values. The RAM stores the data any time as a working area for the controller 10 to carry out various types of data processing. Incidentally, in the embodiment, the memory 17 and the data holding 19 are illustrated as discrete components in FIG. 1, but the data holding 19 is actually included in the rewritable ROM.

The information acquisition controller 20 acquires basic information for each of the categories of the embodiment, the information including: for example, halfway information on when the application and content is halfway through; updated date and time information on when the application and content is updated; information on real-timeness the application and content has; execution history information on when the application and content is executed, usage frequency information on when the application and content is used; keywords included in the application and content; remaining battery level information of the mobile phone terminal acquired from the power management IC 21; radio wave state information of the mobile phone terminal acquired from the communications circuit 11; and billing information for mobile phone terminal use. Incidentally, the basic information the information acquisition controller 20 acquires will be described in detail below.

The controller 10 provides controls of the communication in the communications circuit 11, the audio processing section 25 and the image processing section 26, and the components of the mobile phone terminal of the embodiment, while carrying out various calculation processes. In the embodiment, the controller 10 calculates the recommendation values R based on the basic information of each of the categories the information acquisition controller 20 acquired, at predetermined time intervals, or when the "specific button" is pressed, or when any event occurs. Upon detecting that the "specific button" is pressed, the controller 10 gives priorities to the applications and contents according to the recommendation values R, causing the applications and contents to be displayed on the display of the display section 15, so that the user can select any of the applications and contents displayed in the priority order. When the user selects a desired application and content among the applications and contents displayed in the priority order, the controller 10 executes the selected application and content. Incidentally, the calculation of the recommendation values R for the prioritization of applications and contents as well as the display of applications and contents by the controller 10 will be described in detail below.

In the example of FIG. 1, the controller 10 and the information acquisition controller 20 are illustrated as discrete components, but the functions of the controller 10 and the information acquisition controller 20 may be supported by a single CPU (Central Processing Unit).

In addition, the mobile phone terminal of the embodiment includes components that a typical mobile phone terminal includes, and their illustrations are omitted in FIG. 1.

[System Configuration]

Figure 2:
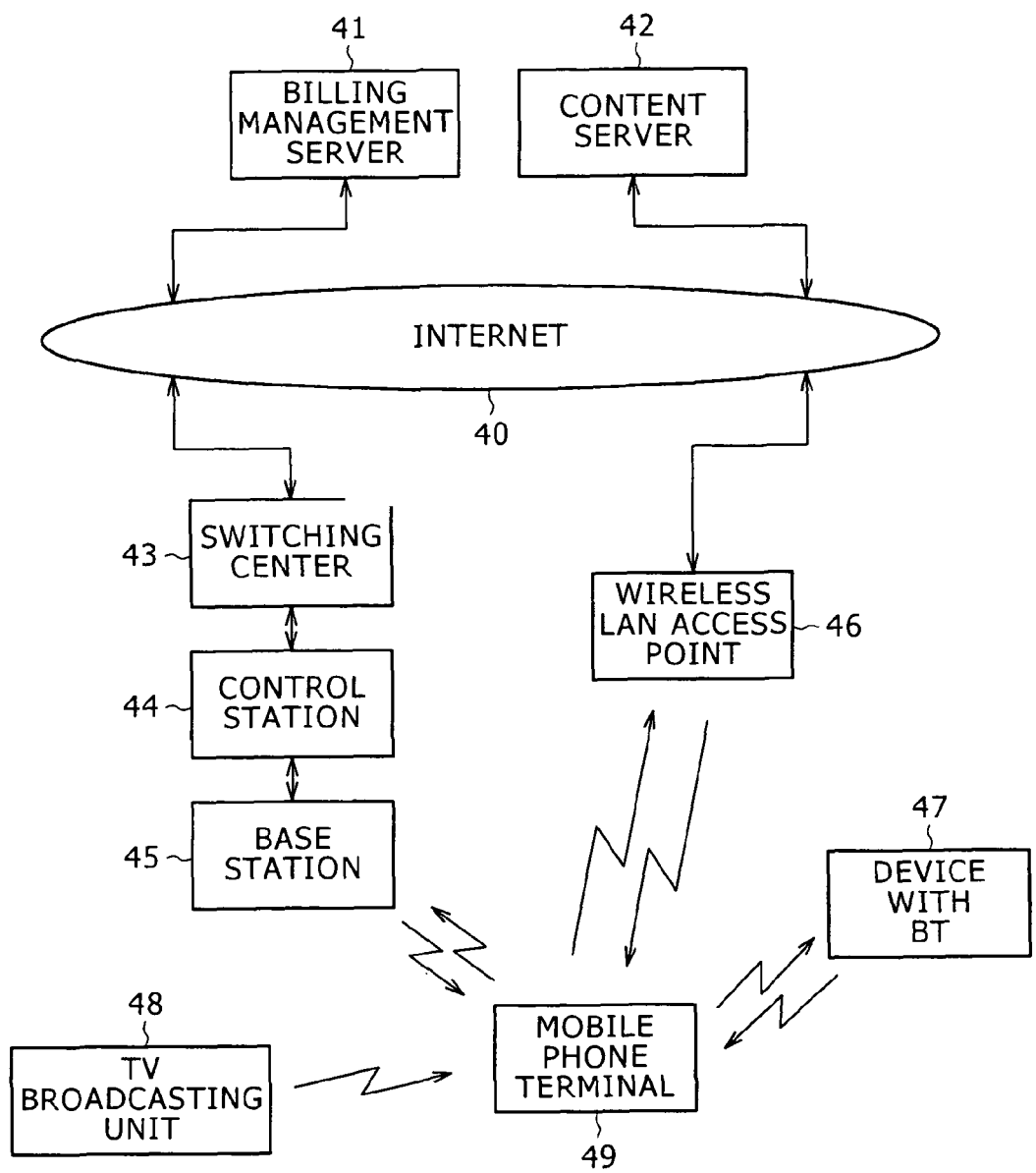
FIG. 2 is a view showing the general system configuration of an embodiment system including the mobile phone terminal according to the embodiment.

FIG. 2 shows the general system configuration of a system of the embodiment including a mobile phone terminal 49 of the embodiment.

In FIG. 2, the mobile phone terminal 49 of the embodiment is designed to be able to connect to an internet 40 via a wireless LAN access point 46, a mobile phone system base station 45, a control station 44, and a switching center 43. Connected to the internet 40 are a content server 42 for providing various applications and contents, and a billing management server 41. The mobile phone terminal 49 of the embodiment can download desired applications and contents by connecting to the internet 40 via the wireless LAN access point 46 and the mobile phone system, and further connecting to the content server 42 via the internet 40. The mobile phone terminal 49 can also acquire the billing information for application/content downloads and terminal use by connecting to the billing management server 41.

Further, the mobile phone terminal 49 of the embodiment is designed to be able to receive television airwaves broadcast by a television broadcast device 48 of a broadcast station, and carry out short-range communication with a short-range communication device of the BleuTooth system (denoted as a device with BT 47 in FIG. 2).

[Display Example on Display]

Figure 3:
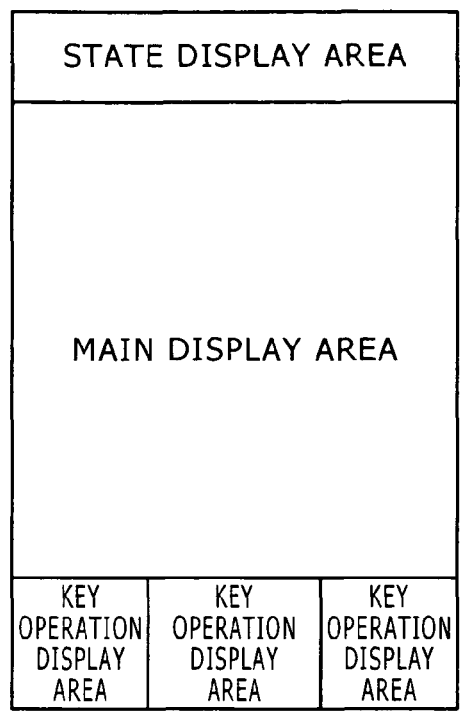
FIG. 3 is a view showing an example of a user interface window displayed on a display of a display section of the mobile phone terminal according to the embodiment.
Figure 4:
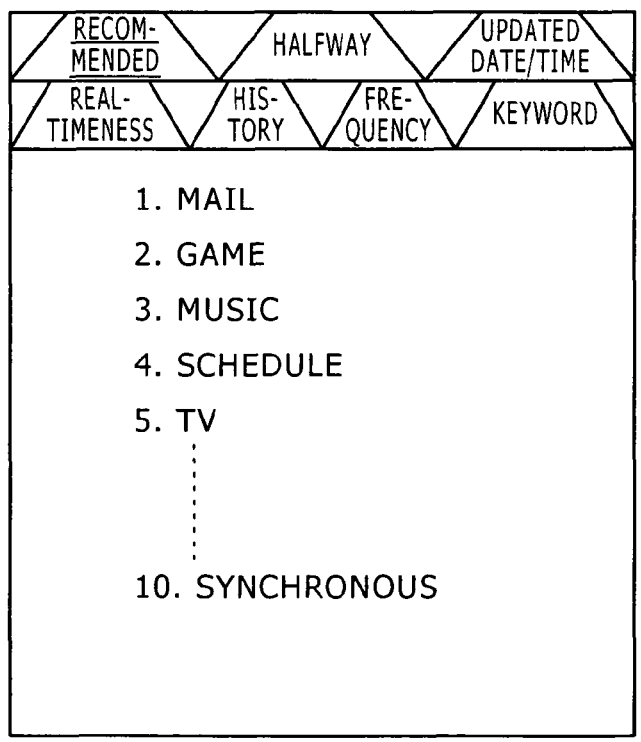
FIG. 4 is a display example on a main display area of the user interface window of FIG. 3, which is a view showing an example of a display level of an application hierarchy.

The controller 10 of the mobile phone terminal of the embodiment causes a user interface window, for example, as shown in FIGS. 3 and 4, to be displayed on the display of the display section 15, when the "specific button" is pressed by the user. Incidentally, FIG. 4 shows a view extracted from a main display area of FIG. 3.

In other words, upon detecting that the "specific button" is pressed, the controller 10 of the mobile phone terminal of the embodiment causes the user interface window including, as shown in FIG. 3, a state display area for showing the current terminal state, the main display area for displaying the recommended applications and contents to the user, and a key operation display area for displaying the soft keys, to be displayed on the display of the display section 15.

As shown in FIG. 4, for example, a plurality of categorized and selectable tabs are displayed on the main display area. Further, text icons representing a plurality of selectable applications and contents (only applications in the example of FIG. 4) are displayed in the currently selected tab, in the order of priority based on the recommendation values R. In the example of FIG. 4, the "Recommended" tab is displayed, together with the category tabs "Halfway Category", "Updated Date and Time Category", "Real-Timeness Category", "History Category", "Frequency Category" and "Keyword Category". The "Recommended" tab currently selected is, for example, underlined. Incidentally, the tabs of "Radio Wave/Access Condition Category", "Battery Level Category", and "Billing State Category" are not displayed in the embodiment. In the "Recommended" tab, as an example of the applications displayed in accordance with the recommendation values R, the text icons representing the applications of "Mail", "Game", "Music Player", "Schedule", "TV", . . . , "Synchronous" are displayed in the order of priority. In the case of the example of FIG. 4, it is designed to display the top ten applications with the higher recommendation values R in the tab. Incidentally, there may be displayed only applications with the recommendation values R exceeding a predetermined threshold value, in the tab. In the example of FIG. 4, only the applications are displayed in the priority order. However, in the invention, it is also designed to vertically display only the contents, or to mix and display applications and contents, as described below.

The mobile phone terminal of the embodiment allows the user to select a desired tab among the tabs with the operation of the operation section 16, as well as to select a desired one of the applications and contents displayed in the selected tab. Upon selection of the desired one among the applications and contents, the controller 10 executes the selected application and content.

[Calculation of Recommendation Value related to User Preference]

Hereinafter, the description will be made, in the mobile phone terminal of the embodiment, on an example of determining the recommendation value R using the basic information of each category on the user preference of the above described categories to display applications and contents on the display in the priority order based on the recommendation values R. Incidentally, the calculation of the recommendation value R using the information of the categories related to the application use condition will be described below.

The controller 10 of the mobile phone terminal of the embodiment determines the recommendation value R by calculating the following formula (1), using the basic information of each of the categories related to the user preference that the information acquisition controller 20 acquired at predetermined time intervals, or when the "specific button" is pressed, or when any event occurs.

$$R = Wa*A + Wb*B + Wc*C + Wd*D + We*E + Wf*F \quad (1)$$

Here, the recommendation value R in the formula (1) is a quantitative value indicating the recommended degree (hereinafter denoted as the recommendation) when the mobile phone terminal of the embodiment recommends the use of applications and contents to the user. The recommendation value R is determined for each application or for each of the application content items (e.g. contents). Incidentally, as shown in FIG. 5, the application examples in the embodiment are "Mail", "Telephone", "Moving Image Viewer", "Still Image Viewer", "Game", "TV", "Web", "Schedule", "Terminal Setting Change", "Music Player", and "Synchronous". The examples of the application content (contents) are contents c1 representing typical contents examples in each application, and contents c2 representing the details of the relevant contents c1. For example, taking the "Moving Image Viewer" application, the examples of the contents c1 are "View Moving Image" and "Download (DL) Moving Image". The examples of the contents c2 are "View Moving Image of XXX" (XXX is the file name), "Download Moving Image at YYY" (YYY is the site address). The recommendation values R are determined for each of the applications and for each of the contents c1 and c2 of each application.

The letters A to F in the formula (1) represent values determined for each of the categories related to the user preference. In the embodiment, the categories related to the user preference include "Halfway Category", "Updated Date and Time Category", "Real-Timeness Category", "History Category", "Frequency Category", and "Keyword Category" as shown in FIG. 6. In the table shown in FIG. 6, the value determined by "Halfway Category" is denoted as "A (category value A)", the value determined by "Updated Date and Time Category" as "B (category value B)", the value determined by "Real-Timeness Category" as "C (category value C)", the value determined by "History Category" as "D (category value D)", the value determined by "Frequency Category" as "E (category value E)", and the value determined by "Keyword Category" as "F (category value F)", respectively. In other words, the category value A is the information for reflecting the user request to subsequently execute the application and content again, for example when the application and content is terminated halfway through, in the recommendation value R. The category value B is the information for reflecting the user preference toward the newness of the application and content, in the recommendation value R. The category value C is the information for reflecting the user request for the immediacy the application and content has, in the recommendation value R. The category value D is the information for reflecting the user request for the continuous use of the application and content, in the recommendation value R. The category value E is the information for reflecting the user request for the customary use of the application and content, in the recommendation value R. The category value F is the information for reflecting the keyword related to the user preference, in the recommendation value R. These pieces of information are acquired by the information acquisition controller 20.

Further, the letters Wa to Wf in the formula (1) represent weighted coefficients corresponding to each of the category values A to F related to the user preference. This information is also acquired by the information acquisition controller 20.

Hereinafter, the description will be made on the meaning and advantages of the categories related to the user preference, how to calculate the category values A to F, and the acquisition method of the various types of basic information used for determining the category values A to F. Incidentally, f(x) represents the function of x in the following description. Here, it is not a question of what the function expression is like. For example, with f (current date and time−usage date and time), then x is the value determined by (current date and time−usage date and time). Incidentally, f(x) exemplified herein is the function relative to the current date and time and the usage date and time, where (current date and time−usage date and time) is an example and the embodiment is not limited to this.

["Halfway Category" and Category Value A]

First, "Halfway Category" and its category value A will be described.

For example, in a device having an intermittent usage pattern as a mobile phone terminal, when applications and contents are once terminated for some reason, for example, while the electric game is being executed, the email text is being created, and the moving image is being reproduced on the moving image viewer, it is thought that the user would request or prefer to continuously execute these applications and contents once terminated halfway through, for example, from the point of termination. In order to reflect such a request or preference of the user, the embodiment is designed to provide "Halfway Category" and use the category value A in the "Halfway Category" for the calculation of the recommendation value R.

Thus, when the execution of an application and content is terminated halfway, the information acquisition controller 20 of the embodiment acquires the halfway termination date and time information and the information indicating the application and content terminated halfway through as the basic information, and stores the acquired information in the data holder 19. In other words, for example, when the viewing (reproduction) is terminated during the moving image viewing (reproduction) on the moving image viewer; when the created email is stored, for example, in the so-called draft folder without being sent; and when the electronic game is terminated halfway through, the information acquisition controller 20 acquires and stores the information on the applications and contents as well as the termination date and time information as the basic information.

Then, the controller 10 calculates the category value A of "Halfway Category" for each application and content, using the termination date and time information as well as the application/content information that are stored in the data holder 19, at predetermined time intervals, or when the "specific button" is pressed, or when any event occurs. More specifically, the controller 10 calculates using the function f(x) so that the newer the termination date and time of the application and content halfway through the more increased the category value A is. However, as the implication of the newness of the date and time varies depending on the types of applications and contents, it is possible to change the degree of how much the category value A is increased for each application and content, by applying an adjustment with a predetermined coefficient Pa to each of the applications and contents.

In other words, in the embodiment, the controller 10 calculates the category value A through the formula (2) for each application and content. Incidentally, in the formula (2), Tp represents the value indicating the current date and time, and Th represents the value indicating the termination date and time.

$$A=(f(Tp-Th))*Pa \qquad (2)$$

["Updated Date and Time Category" and Category Value B]

Next, "Updated Date and Time Category" and its category value B will be described.

The mobile phone terminal of the embodiment is designed to be able to newly acquire various applications and various contents such as new music contents, moving image contents, and electronic game contents by download via the Internet or transfer from the external memory or other methods, as well as to newly take image contents by a camera, and receive emails. It is thought that the newly acquired applications and contents are those that the user requested or preferred. In order to reflect such a request or preference of the user, the embodiment is designed to provide "Updated Date and Time Category" and use the category value B in "Updated Date and Time Category" for the calculation of the recommendation value R.

Thus, when applications and contents are newly acquired, the information acquisition controller 20 of the embodiment is designed to acquire the information indicating the applications and contents as well as their updated date and time information as the basic information and stores the acquired information in the data holder 19. In other words, for example, when a moving image content to be viewed on the moving image viewer is acquired, when a picture (still image content) that can be viewed on the still image viewer is taken, when the picture is edited, and when an email is received, the information acquisition controller 20 acquires the information on the applications and contents and their updated date and time information as the basic information and stores the acquired information in the data holder 19. Incidentally, the updated date and time referred herein includes not only when the applications and contents are rewritten but also when acquired.

Then, the controller 10 of the embodiment calculates the category value B of "Updated Date and Time Category" for each application and content, using the updated date and time information as well as the application/content information, at predetermined time intervals, or when the "specific button" is pressed, or when any event occurs. More specifically, the controller 10 calculates, using the function f(x), so that the newer the updated date and time of the application and content the more increased the category value B is. However, as the implication of the newness of the date and time varies depending on the types of applications and contents, it is also possible to change the degree of how much the category value B is increased for each application and content by applying an adjustment with a predetermined coefficient Pb to each of the applications and contents.

In other words, in the embodiment, the controller 10 determines the category value B by the calculation of the formula (3) for each application and content. Incidentally, in the formula (3), Tp represents the value indicating the current date and time and Tr represents the value indicating the updated date and time.

$$B=(f(Tp-Tr))*Pb \qquad (3)$$

In addition to the updated date and time of the application and content, the date and time when the application and content is released or created may be used in the calculation of the recommendation value R. In this case, the category value B' related to the release or creation of the application and content can be determined by the calculation of the formula (3) Incidentally, in the formula (3)', Tr' represents the value indicating the release or creation date and time and Pb' represents the predetermined coefficient.

$$B=(f(Tp-Tr'))*Pb' \quad (3)'$$

Incidentally, in the case of using the release or creation date and time of the relevant application and content for the calculation of the recommendation value R, the category value B' determined by the formula (3)' and the arithmetic expression (B' *Wb') of weighted coefficient Wb' corresponding to the category value B' are added to the formula (1).

["Real-Timeness Category" and Category Value C]

Next, "Real-Timeness Category" and its category value C will be described.

The mobile phone terminal of the embodiment, for example, is designed to be able to view television broadcasts, and acquire news, sports moving images, sound and the like that are delivered via the mobile phone system and the Internet. However, the applications and contents such as the television broadcasts, news, and sports would often lose the significance and value unless they are viewed in real time. Further, in relation to the applications and contents on schedule, it would be necessary to take into account the real-timeness. Supplementing the description on schedule, in the case where the schedule information is registered in the mobile phone terminal of the embodiment, the preference having the real-timeness would exist where the schedule is confirmed, for example, when the "specific button" is pressed or within a fixed time period (e.g. one hour, one day) after pressed. In order to reflect the user request or preference that makes much of the real-timeness, the embodiment is designed to provide "Real-Timeness Category" and use the category value C in "Real-Timeness Category" for the calculation of the recommendation value R.

Thus, the information acquisition controller 20 of the embodiment acquires, for example, the so-called EPG (Electric Program Guide) data in television broadcasting, the information associated with (or included in) the music and moving image contents, the information acquired from the webpage on the Internet, and the information indicating these applications and contents as the basic information, and stores the acquired information in the data holder 19. In other words, the information acquisition controller 20 acquires, for example, information on the television program name and its broadcast date, day of the week, broadcast time, channel, cast, genre and the like for television broadcasting; information on the title, reproduction time length, artist name(s), composer, genre and the like for the music content; information on the title, reproduction time length, cast name(s), director name, genre and the like for the moving image content; and information on the sender address, recipient address, title and the like for the email, as well as information indicating these applications and contents as the basic information, and stores the acquired information in the data holder 19. In the case of the schedule, the information acquisition controller 20 acquires information on the existence or non-existence of the schedule and its content information at certain time intervals as the basic information, and stores the acquired information in the data holder 19. Incidentally, in the embodiment, it is assumed to use, for example, the same items as the keywords used in the keyword category described below as the basic information.

Further, in the embodiment, it is previously provided with a table indicating the correspondence relation between the information that is expected to be acquired as the above described basic information (keywords) and the predetermined real-timeness coefficients.

Then, at predetermined time intervals, or when the "specific button" is pressed, or when any event occurs, the controller 10 reads out the real-timeness coefficient corresponding to the keyword from the table, calculates the summation value (Sum value) or maximum value (Max value) of the read out real-timeness coefficients, and multiplies the Sum value or Max value by the value (the category value F of "Keyword Category" described below) determined from the above keyword, thereby to determine the category value C of "Real-Timeness Category".

In other words, the controller 10 determines the category value C by the calculation of the formula (4-1) or formula (4-2) or formula (4-3) for each application and content. Incidentally, in the formulas, F represents the category value F of "Keyword Category" described below, Pc1 to Pcx represent all the real-timeness coefficients read out from the table according to the keyword. Further, in the formulas, Sum (Pc1~Pcx) represents the sum value of all the real-timeness coefficients read out from the table according to the keyword, and Max (Pc1~Pcx) represents the max value of all the real-timeness coefficients read out from the table according to the keyword.

$$C=F*\text{Sum}(Pc1{\sim}Pcx) \quad (4\text{-}1)$$

or $$C=F*\text{Max}(Pc1{\sim}Pcx) \quad (4\text{-}2)$$

or $$C=F*f(Pc1{\sim}Pcx) \quad (4\text{-}3)$$

["History Category" and Category Value D]

Next "History Category" and its category value D will be described.

Generally, the user of the mobile phone terminal may temporarily use applications and contents in a continuous manner. For example, there may be a case where the user acquires a new electronic game and executes almost every day the acquired electronic game in order to play (so-called clear) it to the last, or acquires a music content and listens to the music almost every day, or views the same television program for example broadcast everyday, or creates and sends an email everyday to the same address of a friend or other person. In order to reflect the user request or preference with such a continuousness, the embodiment is designed to provide "History Category" and use the category value D in the "History Category" for the calculation of the recommendation value R.

Thus, the information acquisition controller 20 of the embodiment acquires the information on the date and time when the applications and contents were executed and the information indicating the applications and contents as the basic information, and stores the acquired information in the data holder 19. In other words, for example, when the same electronic game is continuously played, when the same music content is continuously reproduced, when the same television program is continuously viewed, and when the email to the same address is continuously created and sent, the information acquisition controller 20 acquires the information on the applications and contents as well as the information on the dates and times when they were continuously used as the basic information, and stores the acquired information in the data holder 19.

Then, the controller 10 calculates the category value D of "History Category" for each application and content, using the above described usage date and time information and the application/content information, at predetermined time intervals, or when the "specific button" is pressed, or when any event occurs. More specifically, the controller 10 calculates, using the function f(x), so that the newer the usage date and time of the application and content the more increased the category value D is. However, as the implication of the newness of the usage date and time varies depending on the applications and contents, it is possible to change the degree of how much the category value D is increased for each application and content, by applying an adjustment with a predetermined coefficient Pd to each of the applications and contents.

In other words, the controller 10 determines the category value D by the calculation of the formula (5) for each application and content. Incidentally, in the formula (5), Tp represents the value indicating the current date and time and Tu represents the value indicating the usage date and time.

$$D=(f(Tp-Tu))*Pd \quad (5)$$

Incidentally, when a plurality of category values D exist for the same application and content, the plurality of category values D are added to each application and category.

Although the category value D can also be determined using keyword described below, it makes easy to determine the recommendation value R where the user preference is more reflected by providing the history category like this embodiment.

["Frequency Category" and Category Value E]

Next, "Frequency Category" and its category value E will be described.

The user of the mobile phone terminal may customarily use applications and contents. For example, there may be the case where the user communicates with a close friend by email or telephone, synchronizes the schedule, or views a television program broadcast every week. In order to reflect such a customary request or preference of the user, the embodiment is designed to provide "Frequency Category" and use the category value E in the "Frequency Category" for the calculation of the recommendation value R.

Thus, the information acquisition controller 20 acquires the information on the dates and times when applications and contents were used as well as the information indicating the applications and contents as the basic information, and stores the acquired information in the data holder 19. In other words, for example, in such cases where the access is made to the same email address or telephone number, the schedule is synchronized, and the same television program is viewed, the information acquisition controller 20 acquires the information on the applications and contents as well as the date and time information on when they were used as the basic information, and stores the acquired information in the data holder 19.

Then, the controller 10 calculates the category value E of "Frequency Category" for each application and content, using the above described usage date and time information as well as the application/content information, at predetermined time intervals, or when the "specific button" is pressed, or when any event occurs. More specifically, the controller 10 first determines the total number of usage times relating to all the applications and all the contents that have been used within a fixed time period, and the number of usage times for each of the applications and contents, respectively. Then, the controller 10 calculates, using the function f (x), to determine the ratio of the number of usage times for each of the applications and contents per total number of usage times. However, as the implication of the number of usage times varies depending on the applications and contents, it is also possible to change the value of the category value E for each application and content, by applying an adjustment to each of the applications and contents with a predetermined coefficient Pe.

In other words, the controller 10 determines the category value E by the calculation of the formula (6) for each application and content. Incidentally, in the formula (6), Ni represents the value indicating each number of usage times and Nt represents the value indicating the total number of usage times.

$$E=(f(Ni/Nt))*Pd \quad (6)$$

Although the category value E can also be determined using keyword described below, it makes easy to determine the recommendation value where the user preference is more reflected by providing the frequency category like this embodiment.

["Keyword Category" and Category Value F]

Next, "Keyword Category" and its category value F will be described.

It would be possible to presume the preference of the user of the mobile phone terminal, for example, by acquiring the basic profile of the user, the applications and contents the user used, and the keywords associated with or included in the applications and contents and by analyzing statistics on the acquired information. When the keywords are acquired across a plurality of applications and contents, the acquisition frequency of the separate keywords is increased, so that the accuracy of the presumption of the user preference would be improved. Further, when the keywords are acquired across the plurality of applications and contents, for example, even if a new application and content is added, it would be possible to estimate the user preference in rapid response to the addition. In order to reflect the user request or preference across the plurality of applications and contents, the embodiment is designed to provide "Keyword Category" and use the category value F of "Keyword Category" for the calculation of the recommendation value R.

Thus, the information acquisition controller 20 acquires, for example, the so-called EPG data in television broadcasting, the information associated with (or included in) the music and moving image contents, the keywords acquired from the webpage on the Internet, as well as the information indicating the applications and contents as the basic information, and stores the acquired information in the data holder 19. In other words, the information acquisition controller 20 acquires, for example, information on the television program name and its broadcast date, day of the week, broadcast time, channel, cast, genre and the like for television broadcasting; information on the title, reproduction time length, artist name(s), composer, genre and the like for the music content; information on the title, reproduction time length, cast name(s), director, genre and the like for the moving image content; and information on the title, genre, manufacture and the like for the electric game, as well as the information indicating the applications and contents as the basic information, and stores the acquired information in the data holder 19.

Further, in the mobile phone terminal of the embodiment, it is previously provided with a table indicating the correspondence relation between the information that is expected to be acquired as keywords and the coefficients (hereinafter denoted as the keyword coefficients) indicating the preference degrees relative to the keyword.

Then, at predetermined time intervals, or when the "specific button" is pressed, or any event occurs, the controller 10 reads out the keyword coefficient corresponding to the keyword that the information acquisition controller 20 acquired from the table, and determines the summation value (Sum value) or maximum value (Max value) of the read out keyword coefficients, thereby to determine the category value F of "Keyword Category".

In other words, the controller 10 determines the category value F for each application and content by the calculation of the formula (7-1) or formula (7-2) or formula (7-3). Incidentally, Pf1~Pfx in the formulas represent all the keyword coefficients read out from the table according to the keyword. Further, in the formulas, Sum(Pf1~Pfx) represents the sum value of all the keyword coefficients read out from the table according to the keyword, and Max (Pf1~Pfx) represents the max value of all of the keyword coefficients read out from the table according to the keyword.

$$F=\mathrm{Sum}(Pf1{\sim}Pfx) \quad (7\text{-}1)$$

or $$F=\mathrm{Max}(Pf1{\sim}Pfx) \quad (7\text{-}2)$$

or $$F=f(Pf1{\sim}Pfx) \quad (7\text{-}3)$$

Incidentally, the above described categories A to F may be calculated every time when the recommendation value R is calculated, or may be calculated periodically (for example, calculated every hour) so that the previously calculated category values A to F are referred to when the recommendation value R is actually calculated. In the case where the category values A to F are calculated every time when the recommendation be determined, while in the case where the category values A to F are calculated periodically, the calculation volume can be reduced in the determination of the recommendation value R.

[Description of Coefficients]

Hereinafter, the description will be made on the coefficients Pa to Pf used in the calculation of the above described category values A to F, the weighted coefficients Wa to Wf used in the calculation of the recommendation value R.

The initial values of the coefficients Pa to Pf and the weighted coefficients Wa to Wf and the like are previously stored in the mobile phone terminal. The initial values are accordingly updated depending on the use of the applications and contents, under the control of the information acquisition controller 20.

First, the description will be made from the coefficients Pa to Pf used in the calculation of the category values A to F.

In the embodiment, the initial values of the predetermined coefficients Pa, Pb, Pd, Pe used in the calculation of the category values A, B, D, E of "Halfway Category", "Updated Date and Time Category", "History Category", and "Frequency Category", for example, are all assumed to be "1" (which is used in multiplication). The initial values of all the keyword coefficients Pf1 to Pfx used in the calculation of the category value F of "Keyword Category" are assumed to be "0". The real-timeness coefficients Pc1 to Pcx used in the calculation of "Real-Timeness Category" are assumed to have their initial values based on the general information. However, these coefficients vary depending on what functions are defined for the category values A to F, so that the invention is not limited to the numerical values described herein.

Here, a table of FIG. 7 shows a keyword example and an initial value setting example of the keyword coefficients used for determining the category value F of "Keyword Category". A table of FIG. 8 shows a keyword example, an application example, and an initial value setting example of the real-timeness coefficients used for determining the category value C of "Real-Timeness Category". Incidentally, the keywords (news, sports, etc.) shown in the tables of FIGS. 7 and 8 are an example, and the invention is not limited to these items. As seen in the example of the table of FIG. 8, a numerical value other than "0" is used in the calculation as the initial value for the real-timeness coefficient. The numerical value other then "0" is used for the real-timeness coefficient, because there would not be a great difference among users in the preference toward the real-timeness. Further, as shown in FIG. 8, the real-timeness coefficient holds the keywords for each application, and the separate real-timeness coefficients are prepared for each of the keywords. This is because the real-timeness coefficient largely varies depending on the application.

Further, the values of the real-timeness coefficient and the keyword coefficient are allowed to be changed (namely, updated) depending on the usage state of the applications and contents. These coefficients can also be weighted within the category. The update of the coefficients is carried out by the following formulas (8) and (9), under the control of the information acquisition controller 20. Incidentally, the formula (8) is the keyword coefficient calculation formula for each keyword, and the formula (9) is the real-timeness coefficient calculation formula for each keyword. In the formula (8), Pf1 represents the initial value of the keyword coefficient set in the terminal (see the table of FIG. 7), and Nfc represents the number of keyword occurrences. In the formula (9), Pc1 represents the initial value of the real-timeness coefficient set in the terminal (see the table of FIG. 8), and Ncc represents the number of real-timeness event occurrences.

$$Pf=Pf1+\mathrm{Sum}(Nfc) \quad (8)$$

$$Pc=Pc1+\mathrm{Sum}(Ncc) \quad (9)$$

In the formula (8), when an application is used and a predetermined keyword is included in the keywords included in the application, the information acquisition controller 20 increases the value of the number of keyword occurrences related to the predetermined keyword by "1". In the formula (9), when an application with the real-timeness is used and the predetermined keyword is included in the keywords included in the application, the information acquisition controller 20 increases the value of the number of real-timeness event occurrences related to the predetermined keyword by "1".

Incidentally, the use of the application with the real-timeness corresponds to, for example, when the user views the program the user enjoys with only in a specific time like The television viewing application, or when the user uses the content with the newly updated date and time (or the release, creation date and time). For example, when the user views television broadcasting, the number of real-timeness event occurrences of the keyword related to the information (e.g. program name, cast, genre) associated with the television program increases by "1", where only the keyword categorized in the relevant television viewing application is counted. When the user uses the content with newly updated date and time (or the release, creation date and time) within a fixed time period from the updated date and time (or the release, creation date and time), the number of real-timeness event occurrences of the keyword related to the information (e.g. program name, cast, genre) associated with the content increases by "1", where only the keyword categorized in the application used in the use of the content is counted. Incidentally, the fixed time period referred above is, for example, one week, three days, one day or one hour. The same time period may be used for all the applications, or different time periods may be defined for each of the applications. For example, the real-timeness would be very low when the user confirms the content of the email within three days from its reception. However, the real-timeness would exist, for example, in such a case where the user purchases and listens to (reproduce) the music content within three days from its release date. Thus, it is desirable to define the fixed time period for each application, if the concept of the time period varies in each application as the above described example. When the relevant fixed time period has passed, the information acquisition controller 20 returns the keyword coefficient and the real-timeness coefficient to the initial values.

Here, as a specific example of the coefficient update by the formulas (8) and (9), for example when the user confirms two emails from a friend u using the email application within a fixed time period (the condition satisfying the real-timeness), the information acquisition controller 20 adds "2" to the keyword coefficient of "Friend u" belonging to the email application, while adding "2" to the real-timeness coefficient corresponding to the keyword of "Friend u". For example, when the user listens to the music of an artist a using the music player application within a fixed time period (e.g., the user listens to the music within the fixed time period after its release), the information acquisition controller 20 adds "1" to the keyword coefficient of "Artist a" belonging to the music player application, while adding "1" to the real-timeness coefficient corresponding to the keyword of "Artist a". For example, when the user views the news program of terrestrial digital television broadcasting using the television broadcast application within a fixed time period, the information acquisition controller 20 adds "1" to the keyword coefficient of "News" belonging to the television broadcast application, while adding "1" to the real-timeness coefficient corresponding to the keyword of "News".

Further, for example, when the user confirms the old news on the web using the web browsing application in a time period exceeding a fixed time period (the condition not satisfying the real-timeness), the information acquisition controller 20 adds "1" to the keyword coefficient of "News" belonging to the web browsing application, while not specifically adding value to the real-timeness coefficient. For example, when the user confirms the old email from the friend u using the email application under the condition of exceeding a fixed time period, the information acquisition controller 20 adds "1" to the keyword coefficient of "Friend u" belonging to the email application, while not specifically adding value to the real-timeness coefficient.

As described above, when the coefficient update is carried out by the use of application under the condition within the fixed time period (the condition satisfying the real-timeness) and the condition not satisfying the fixed time period (the condition not satisfying the real-timeness), the values of the keyword coefficient table shown in FIG. 7 are updated to the values of the table shown in FIG. 9, and the values of the real-timeness coefficient table shown in FIG. 8 are updated to the values of the table shown in FIG. 10.

Incidentally, the above described keyword coefficient and real-timeness coefficient may depend on only the use in a certain fixed time period, or may be summed for all the use cases. Further, the calculation of the keyword coefficient and real-timeness coefficient may be delimited by the number of use cases rather than time. In other words, when delimited by time, the keyword coefficient and the real-timeness coefficient return to their initial values unless the mobile phone terminal is used within the specific time period, but when delimited by the number of use cases, they do not return to their initial values. Further, in the tables of FIGS. 7 to 10, the coefficient values are represented by numerical values as the absolute indicator, but may be set as the relative count value. With the absolute numerical value, the real-timeness coefficient and the keyword coefficient continues to increase within a certain fixed time period, so that the influence of the category values C and F on the recommendation value R may increase. On the other hand with the relative value, it is possible to prevent such a situation. In the case of the above described formulas (8) and (9), the sum (Sum) is simply added to the initial value. However, for example, the function f(x) made up of the initial value and Sum may also be determined. In other words, the weight that each value increases by "1" varies, for example, in the case where the value increases from "300" to "301" and in the case where the value increases from "0" to "1". It may be designed to deal with such a case by the use of the function f(x).

Next, the weighted coefficients Wa to Wf will be described.

The initial values of the weighted coefficients Wa to Wf are stored in the mobile phone terminal. In the embodiment, for example, the initial values of the weighted coefficients Wa to Wf are all set to "1". Of course, it should be noted that the invention does not limit the initial values to "1". Incidentally, the weighted coefficients Wa to Wf may be previously stored in the terminal, or may be transferred from another person's terminal, or may be downloaded from a predetermined site and the like. The weighted coefficients Wa to Wf to be downloaded from a predetermined site would be, for example, those corresponding to the preference of a famous person. Particularly, when the weighted coefficients Wa to Wf in accordance with the preference of a famous person, the preference of the famous person can be reflected in the calculation of the recommendation value R.

Further, in the embodiment, the values of the weighted coefficients Wa to Wf are updated depending on the use of the application and content by the user, under the control of the information acquisition controller 20. By updating the values of the weighted coefficients Wa to Wf, it is possible to give desired weights to the categories A to F, respectively. Thus, like the embodiment, by updating the values depending on the use of the application and content by the user, it is possible to generate the recommendation value R more suitable for the user preference.

In the embodiment, it is designed to rank each application and content with a recommendation depending on the recommendation value R determined by the calculation of the above described formula (1), display the applications and contents on the display in the order of priority, thereby to allow the user to select a desired application and content among those displayed. In the state where the applications and contents are displayed on the display as described above, for example, when the use of the application or content ranked first is selected by the user, the information acquisition controller 20 does not update the weighted coefficients Wa to Wf.

If the user preference is accurately reflected, the first rank should be selected by the user. However, for example, when the use of the application or content ranked second or lower is selected by the user, the information acquisition controller 20 updates the weighted coefficients Wa to Wf, based on the values of Wa*A, Wb*B, Wc*C, Wd*D, We*E, Wf*F in the immediately preceding calculation of the recommendation value R.

More specifically, the information acquisition controller 20, for example, compares the values of Wa*A, Wb*B, . . . , Wf*F corresponding to the recommendation value R of the first ranked application or content with the values of Wa*A, Wb*B, . . . , Wf*F corresponding to the recommendation value R of the application or content selected from the second or lower ranks, respectively. The information acquisition controller 20 picks up values larger than the values in the first rank, among the values selected by the user from the second or lower ranks, and then increases the values of the weighted coefficient Wx (where x represents a to f) corresponding to those picked up, by "1" respectively.

As described above, when the application and content ranked second or lower is selected by the user, a weighted coefficient with a larger value than the corresponding value in the first rank is increased, allowing the values of the weighted coefficient to be changed in the direction in which the recommendation value R of the selected one becomes larger, so that the user preference can be accurately reflected.

Incidentally, when the application and content ranked second or lower is selected by the user, the information acquisition controller 20 may pick up only the value with the largest value difference of the above described larger values, and increase only the values of the weighted coefficient Wx corresponding to the picked up value, by "1". Alternatively, the information acquisition controller 20 may increase all the values of the weighted coefficient Wx corresponding to the application and content selected by the user from the second or lower ranks, by "1". When the values of the first rank exceed the values selected in the second or lower ranks in all of the items Wa*A, Wb*B, ..., Wf*F, it is thought that the application and content in the first rank would be much preferred by the user than the other, so that the information acquisition controller 20 desirably does not update the weighted coefficient. Similarly to the above description on the keyword coefficient and the real-timeness coefficient, it may be designed to relatively increase the coefficient values, instead of increasing them with absolute numerical values.

In addition, as shown in the above FIGS. 3 and 4, when the applications and contents are displayed in each tab, for example, when any of the following tabs, "Halfway Category", "Updated Date and Time Category", "Real-Timeness Category", "History Category", "Frequency Category", and "Keyword Category", is selected excepting the "Recommended" tab, and when a desired one is selected among the applications and contents displayed in the selected tab, it is also possible to carry out the coefficient update so as to increase the values of the weighted coefficient corresponding to the category value of the selected tab. In other words, selecting the application and content from any of the tabs other than the "Recommended" tab means that the user carries out the selection referring to the category condition of the selected tab, so that the coefficient update that increases the values of the weighted coefficient corresponding to the category value of the selected tab is effective.

The table of FIG. 11 shows an example of the above described weighted coefficients Wa to Wf.

In other words, FIG. 11 exemplifies a case where the value of the weighted coefficient Wa of "Halfway Category" is "10", the weighted coefficient Wb of "Updated Date and Time Category" is "6", the weighted coefficient Wc of "Real-Timeness Category" is "8", the weighted coefficient Wd of "History Category" is "1", the weighted coefficient We of "Frequency Category" is "8", and the weighted coefficient Wf of "Keyword Category" is "8".

FIG. 12 shows a table containing the category values A to F corresponding to the top 5 of the recommendation values R which are determined for each application and content by the calculation of the formula (1) using the weighted coefficients Wa to Wf of FIG. 11 and the above described category values A to F, and the values determined by multiplying the category values A to F by the weighted coefficients Wa to Wf of FIG. 11.

As seen from this FIG. 12, for example, when taking only the category value F of "Keyword Category", the value of the "TV" application is the largest. However, according to the embodiment, the recommendation of the "Mail" application is the highest due to the calculation of the recommendation value R using the category values A to F and the weighted coefficients Wa to Wf. Thus, in the case of FIG. 12, "Mail" is displayed at the highest level on the main display area of the display, followed by "Game", "Music Player", "Schedule", and "TV", as shown by FIG. 4 in the above description. In other words, according to the example of FIG. 12, the "Mail" application is displayed at the first level, so that the user, for example, can confirm the mail from an important friend without fail. Further, according to the example of FIG. 12, for example, "Game" is displayed second due to taking into account that this application is recently downloaded and that the game is not completed yet while being played in a continuous manner.

Further, FIG. 12 shows the table containing the information in the case where the ranking order is determined at the application level based on the recommendation value R. In the embodiment, as shown in FIG. 13, the ranking order is also determined across the application hierarchy and the content hierarchies based on the recommendation value. R. According to the embodiment, as shown in FIG. 13, by determining the ranking order across the applications and contents, it is possible to further recommend the user to confirm the unopened mail from the friend u as the content in the "Mail" application of the highest recommendation.

Although the embodiment shows the example of the ranking of the recommendation value R determined by the total of the category values A to F (the example of the "Recommended" tab of FIG. 4), the ranking may be determined for each category, or may be determined by the calculation of the recommendation value R where only desired two or three category values are reflected. In other words, in the formula (1), the calculation may be carried out using only the item of Wx*X (where x represents the desired value of a to f, X represents the desired value of A to F) corresponding to the desired category, where the other items are deleted or the weighted coefficient Wx is set to "0" The item of Wx*X of one category is only used to determine the recommendation values R for each of the categories. Particularly, the display is carried by determining the ranking by the total of the category values A to F as well as by determining the ranking for each of the categories, which makes it possible to provide information from the different angles to the user, and to reflect the selections in each of the categories in the weighted coefficient update.

[Calculation of Recommendation Value related to Application Use Condition]

The description has been made on the calculation of the recommendation value R based on the category values A to F related to the user preference. In the embodiment, it is also possible to recommend the use of applications and contents to the user, in accordance with the recommendation based on both of the user preference and the application use condition, by determining the recommendation value R, for example, adding the category value G of "Radio-Wave/Access State Category", category value H of "Battery Level Category", and category value I of "Billing State Category" that are all related to the application use condition (use environment), in addition to the category values A to F related to the user preference.

In other words, of the applications and contents, there are some applications and contents making no sense unless the communication is made in the mobile phone terminal, or there are some where the battery consumption of the mobile phone terminal is accelerated by the use of the applications and contents, or there are some that are billed for the use of the applications and contents. For example, in such a case where the available channel is fixed in the television viewing application, it is nonsense to recommend the view of another unavailable channel based on the calculation of the recommendation value R. It is nonsense to recommend the use of the application and content for synchronizing schedule between with the short-range communication device although no short-range communication device of BleuTooth system exists in the vicinity of the mobile phone terminal. Further, it is inappropriate to recommend the use of the application and content for which the billing newly occurs to the user with the payment amount for one month reaches the maximum. It is also inappropriate to recommend the use of the application and content where the battery consumption is accelerated when the remaining battery level of the mobile phone terminal is small.

Thus, in the embodiment, it is provided with "Radio-Wave/ Access State Category", "Battery level category", and "Billing State Category" as the categories related to the application use condition, and the category values G to I of these categories are added to the calculation of the recommendation value R, thereby to prevent the execution of the nonsense and inappropriate recommendations as described above.

In the mobile phone terminal of the embodiment, the recommendation value R is determined by the calculation shown in the following formula (10) or (11), taking into account the above described user preference and the relevant application use condition.

$$R = Wa^*A + Wb^*B + Wc^*C + Wd^*D + We^*E + Wf^*F + (Wg^*G + Wh^*H + Wi^*I) \quad (10)$$

$$R = (Wa^*A + Wb^*B + Wc^*C + Wd^*D + We^*E + Wf^*F)^* (Wg^*G + Wh^*H + Wi^*I) \quad (11)$$

Here, assuming $(Wg^*G+Wh^*H+Wi^*I) \leqq 0$ for the formula (10) and $\leqq 0(Wg^*G+Wh^*H+Wi^*I) \leqq 1$ for the formula (11). Thereby, as an example, when the radio wave from the short-range communication device of BlueTooth system is not confirmed, the schedule synchronous is excluded from the ranking based on the recommendation value R. Incidentally, Wg to Wi in the formulas (10) and (11) represent the weighted coefficients respectively corresponding to the category values G to I related to the application use condition.

Hereinafter, the description will be made on the meaning and advantages in the application use condition, how to determine the category values G to I, and the acquisition method of the basic information used for determining the category values G to I. The description will be made, for example, assuming that the formula (11) is used.

[Use of "Radio-wave/Access State Category"]

First, a usage example of "Radio-Wave/Access State Category" will be described.

The mobile phone terminal of the embodiment includes the radio-wave state measuring circuits for measuring the radio wave state (e.g. radio wave strength) within the communications circuit 11, the GPS controller 27, the short-range communication controller 29, and the WLAN controller 31, respectively. The communications circuit 11, the GPS controller 27, the short-range communication controller 29, and the WLAN controller 31 respectively measure the radio wave strength by the separately implemented radio wave state measuring circuits. The measured values of the radio wave strength are sent to the information acquisition controller 20 as the basic information related to "Radio-Wave/Access State Category".

Then, when the application and content can be used without using wireless communications equipment such as the communications circuit 11, GPS controller 27, short-range communication controller 29, and WLAN controller 31, or when the application and content for which wireless communications equipment is necessary and the measured value of the radio wave strength corresponding to the relevant wireless communications equipment exceeds the reference value (the radio wave strength is sufficient), the controller 20 calculates the recommendation value R with the value of the item Wg*G of the formula (11) set to "1", at predetermined time intervals, or when the "specific button" is pressed, or when any event occurs. On the other hand, in the application and content for which the wireless communications equipment is necessary, when the measured value of the radio wave strength corresponding to the relevant wireless communications equipment is below the reference value (when the communication may be impossible due to insufficient radio wave strength), the controller 20 calculates the recommendation value R with the value of the item Wg*G of the formula (11) set to "0". For example, taking an example of the application and content for which the communications circuit 11 is used, the controller 20 calculates the recommendation value R with the value of the item Wg*G of the formula (11) set to "0", when CPICH Ec/Io in WCDMA is below the reference value, or CPICH RSCP is below the reference value.

Thus, in the mobile phone terminal of the embodiment, it is possible to prevent recommending the use of the application and content that makes nonsense unless the communication is not made, to the user.

[Use of "Battery Level Category"]

Next, a usage example of "Battery level category" will be described.

In the mobile phone terminal of the embodiment, the power management IC 21 manages the remaining amount of the battery 22. The remaining battery level information is sent to the information acquisition controller 20 as the basic information related to "Battery Level Category".

Then, when the remaining battery level is larger than the battery amount expected to be consumed by the application and content, the controller 20 calculates the recommendation value R with the value of the item Wh*H of the formula (11) set to "1", at predetermined time intervals, or when the "specific button" is pressed, or when any event occurs. On the other hand, when the battery amount expected to be consumed by the application and content exceeds the remaining battery level, the controller 20 calculates the recommendation value R with the value of the item Wh*H of the formula (11) set to "0".

Thus, in the mobile phone terminal of the embodiment, it is possible to prevent recommending the use of the application and content causing a state where the battery of the mobile phone terminal is not kept, to the user.

[Use of "Billing State Category"]

Next, a usage example of "Billing State Category" will be described.

The mobile phone terminal of the embodiment is designed to bill for the call charge and packet fee depending on the telephone calls and application/content downloads and the like. In the case where the user subscribes to a service that an upper limit can be established for the payment amount in a predetermined period, for example, one month, the information on the maximum payment amount is registered in the mobile phone terminal of the embodiment.

Thus, the information acquisition controller 20 causes the data holder 19 to store the information on whether to bill for the use of applications and contents, and the use of the communication methods of the communications circuit 11, GPS controller 27, short-range communication controller 29 and WLAN controller 31, respectively, as well as the information, upon a telephone call and packet communication, on whether their billing is based on a fixed charge or a hourly charge. Incidentally, if not based on the hourly charge, the billing is not done for a new use of the communication method, so that it is the communication method not to be billed. The information acquisition control 20 also acquires, for example, the usage fee information previously acquired from the billing management server 41 of FIG. 2.

Then, when the application and content and the communication method will not be billed for their use, or when the usage fee is below the maximum payment amount, for example, for one month, although the application and content and the communication method will not be billed for their use, the controller 20 calculates the recommendation value R with the value of the item Wi*I of the formula (11) set to "1", at predetermined time intervals, or when the "specific button" is pressed, or when any event occurs. On the other hand, in the application and content and the communication method to be billed for the use, when the usage fee exceeds the maximum payment amount, for example, for one month, the controller 20 calculates the recommendation value R with the value of the item Wi*I of the formula (11) set to "0". Further, upon the use of a certain application and content, when a plurality of communication methods can be used and any of the plurality of communication methods will not be billed (or will be billed), the controller 20 determines which communication method should be used. When the plurality of communication methods will be respectively billed, the controller 20 determines whether the value of the item Wi*I is set to "1" or "0" through the comparison of the usage fee and the maximum payment amount. Incidentally, for example when the same application and content is downloaded, the communication method not to be billed includes, for example, such communication as using the WLAN controller 31 and WLAN antenna 32. The communication method to be billed includes packet communication via the communication antenna 12 and the communications circuit 11.

Thus, in the mobile phone terminal of the embodiment, it is possible to prevent recommending the use of the application and content for which billing newly occurs to the user, for example, with the payment amount for one month reaches the maximum.

Incidentally, upon determination of the recommendation value R of the application (e.g. the schedule synchronous) that is often restricted by the above described use condition, the influence of the restriction can be alleviated by taking into account the influence thereof. For example, it is thought to cover (alleviate) the influence due to low usability of the application in such a way that the number of times that the application could not be used is not included in the denominator for the determination of the frequency, or that the ratio of the use restriction is determined to adjust (e.g. increase) with the coefficients (Pa to Pf).

Next, FIG. 14 shows a table where the category values G to I for "Radio-wave/Access State Category", "Battery level category", and "Billing State Category" and weighted coefficients Wa to Wf are added to the above described table of FIG. 11.

In the case of the example of FIG. 14, "Radio-Wave/Access State Category", "Battery Remaining Category", and "Billing State Category" are added, thereby, for example, the recommendation values R for "Game", "Schedule", and "TV" are "0", and the recommendation of the "Mail" application is ranked first followed by "Music Player".

Further, the recommendation value R for each application is determined in such a way that the recommendation value R is determined for each content c2 of the above described table shown in FIG. 5, and the sum of all the recommendation values R of the contents c2 is the recommendation value R of a content c1, and further the sum of all the recommendation values R determined for each of the relevant contents c1 is the recommendation value R of the relevant application. Incidentally, the example of FIG. 14 only takes into account the contents c1, such as, "Confirm unopened email of friend u" for "Mail", "Play game recently downloaded" (associated with billing due to the occurrence of data communication) for "Game", "Listen to music" for "Music Player", "Schedule synchronous" (synchronous with BleuTooth communication) for "Schedule", and "View TV" for "TV".

[Display Level on Display]

The above described FIG. 5 shows a hierarchical structure of the application and contents (contents c1, c2). In order to display the applications and contents on the display based on the recommendation value R, it is thought, for example, that the recommendation value R is determined for each of the hierarchies to display the applications and contents for each of the hierarchies, or that the recommendation value R is determined across the hierarchies to display the applications and contents across the hierarchies.

The above described display example of FIG. 4 is an example of the display level where the recommendation value R is determined for each hierarchy of the applications to display the applications in the ranking order, using the above described example of FIG. 12. In order to determine the recommendation value R for each application hierarchy like this example, the recommendation value R of a content c2 of FIG. 5 corresponding to the application is determined, and the recommendation value R of a content c1 is further determined by the sum of all the recommendation values R of the contents c2, and then the recommendation value R of the relevant application hierarchy is given by the sum of all the recommendation values R of the contents c1. Incidentally, in this example, similarly to the example of FIG. 14, the items of the contents c1 and c2 are limited for the purpose of simplification, but the recommendation values R are actually calculated taking into account the contents c1 and c2 exemplified in FIG. 5.

Further, in relation to the display level on the display, when the display in the ranking order based on the recommendation value R for the application hierarchy exhibits a much higher abstract degree, for example, the display may be carried out at the display level in the ranking order based on the recommendation value R for the content c1 hierarchy, or at the display level in the ranking order based on the recommendation value R for the content c2 hierarchy, or at the display level in the raking order based on the recommendation value P across the application hierarchy, content c1 hierarchy and content c2 hierarchy. As the indication for the display at the display level in the ranking order across the hierarchies, for example, it is thought when the recommendation value R of the upper hierarchy and the recommendation value R of the lower hierarchy are identical to each other, or when the proportion of the recommendation value R of the lower hierarchy to the recommendation value R of the upper hierarchy exceeds a certain ratio, in other words, when the recommendation value P of the lower hierarchy can be determined as dominant. Further, the display may be carried out at the display level of any hierarchy simply when the recommendation value R exceeds a certain value.

Figure 15:
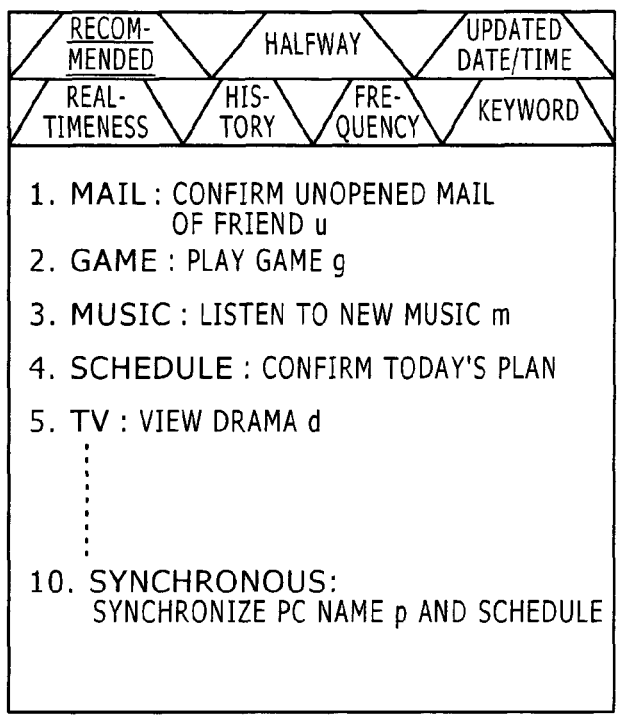
FIG. 15 is a display example on the main display area of the user interface window of FIG. 3, which is a view showing an example of a display level of the application hierarchy and the corresponding contents c2 hierarchy.

FIG. 15 shows an example of the display level where the applications are displayed in the ranking order on the main display area, by determining the recommendation value R for each application hierarchy. Incidentally, in this example, the items each having the highest recommendation value R of the contents c2 are displayed next to each of the application names.

Figure 16:
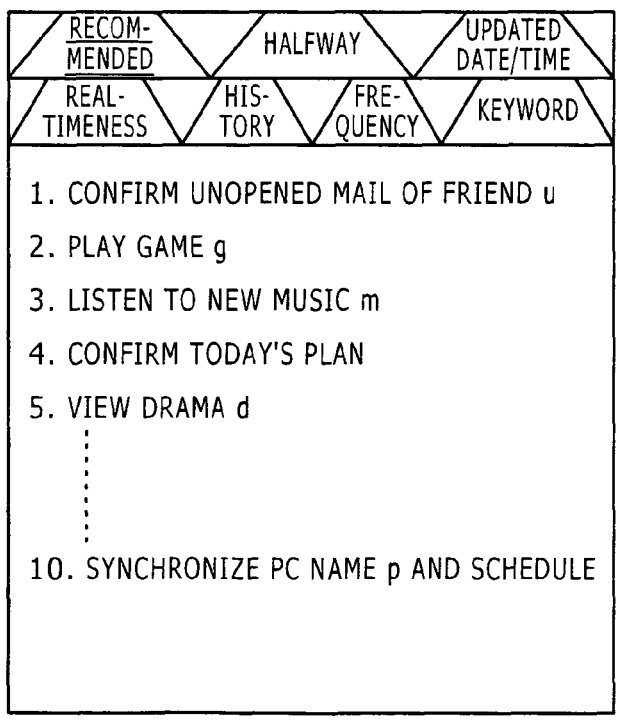
FIG. 16 is a display example on the main display area of the user interface window of FIG. 3, which is a view showing an example of a display level of the contents c2 hierarchy.

FIG. 16 shows an example of the display level where the contents c2 are displayed in the ranking order on the main display area by determining the recommendation value R for each hierarchy of the contents c2.

Figure 17:
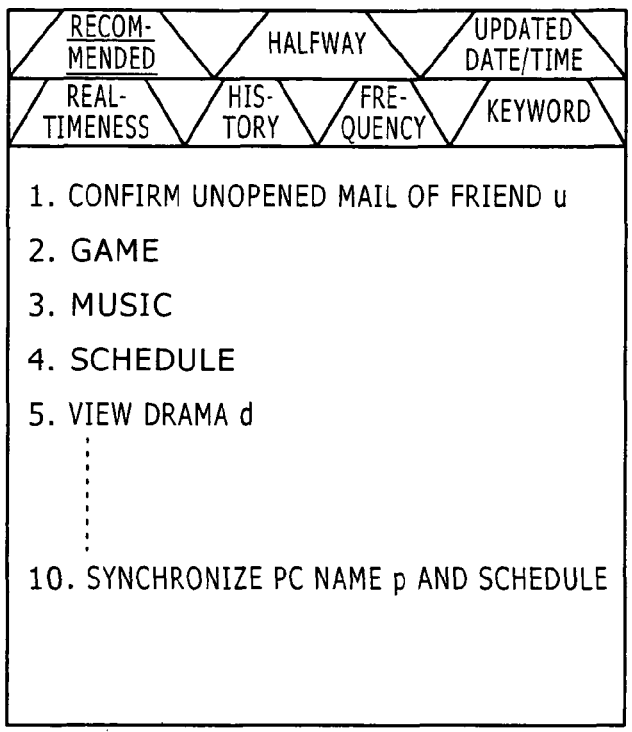
FIG. 17 is a display example on the main display area of the user interface window of FIG. 3, which is a view showing an example of a display level across the application hierarchy, the contents c1 hierarchy and the contents c2 hierarchy.

FIG. 17 shows an example of the display level where each of the applications and the contents c1, c2 are displayed in the ranking order on the main display area, by determining the recommendation value R across the application hierarchy, the content c1 hierarchy, and the content c2 hierarchy.

Figure 18:
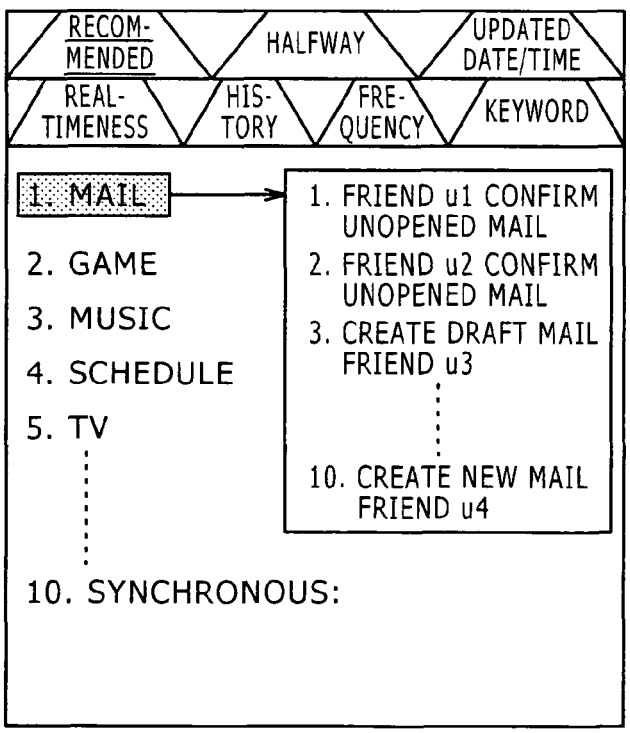
FIG. 18 is a display example on the main display area of the user interface window of FIG. 3, which is a view showing an example where each of the contents c2 corresponding to a "Mail" application selection are displayed in the ranking order on another window, at the display level of the application hierarchy of FIG. 4.

FIG. 18 shows an example that, for example at the display level where the applications are displayed in the ranking order corresponding to the recommendation value R determined for each application hierarchy as shown in FIG. 4, for example, the "Mail" application ranked first is selected by the user and the contents c2 located in the lower hierarchy of the selected application are displayed in the ranking order on another window.

As described above, the display is carried out at the display level set by changing each of the hierarchies of the application and contents c1, c2, or at the display level across the hierarchies, which makes it possible to recommend the use of the applications and contents to the user with an appropriate abstract degree.

Further, the ranking order of the applications and contents displayed on the main display area can be changed, for example, taking into account the user schedule information.

[Flowchart related to Periodical Recommendation Value Calculation]

Figure 19:
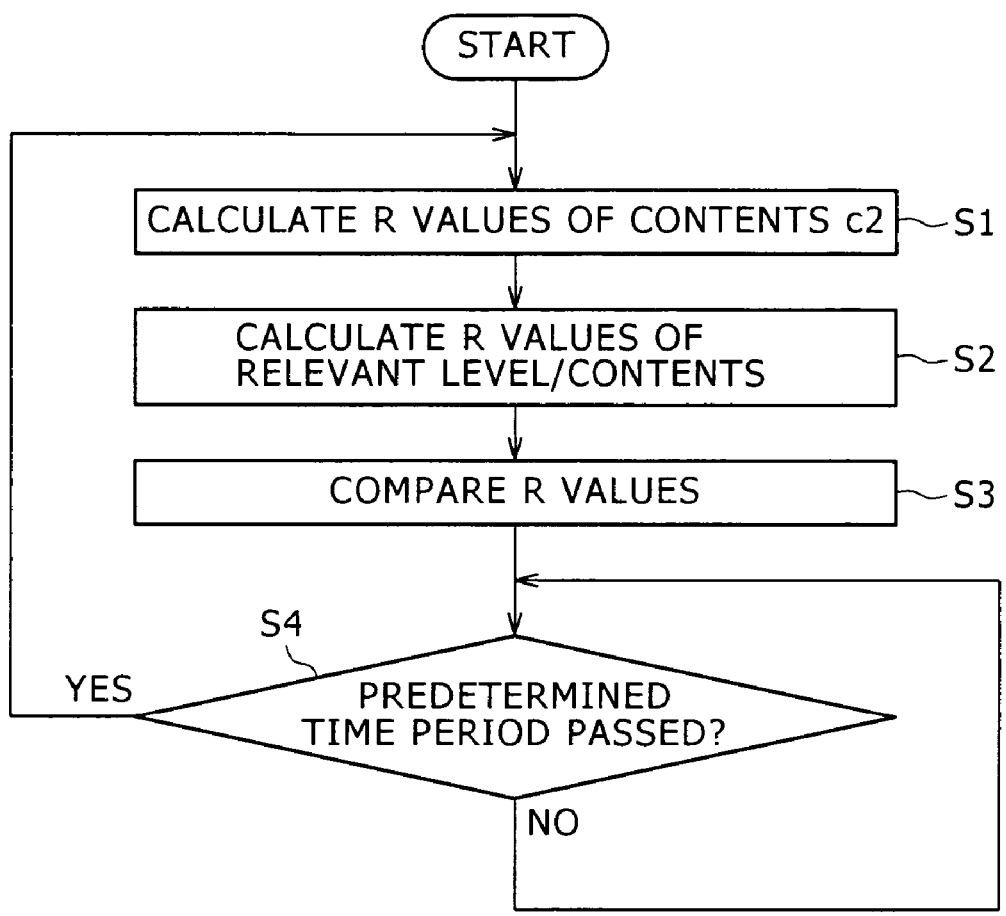
FIG. 19 is a flowchart showing the flow of a calculation process of the recommendation value carried out at predetermined time intervals.

FIG. 19 shows, as an example, the flow of a calculation process of the recommendation value R carried out at predetermined time intervals. Incidentally, in the flowchart, the process moves to the start when the power of the mobile phone terminal is turned on or when the display level setting is changed.

In FIG. 19, when the power of the mobile phone terminal is turned on or when the display level setting is changed, the controller 10 of the mobile phone terminal of the embodiment first calculates the recommendation values R of the contents c2 as the process of Step S1.

Next, as the process of Step 2, the controller 10 determines the recommendation values R related to the display level of the respective hierarchies of the application and contents c1, and the contents. Incidentally, the recommendation value R of the content c1 is determined by the sum of all the recommendation values R of the corresponding contents c2, and the recommendation value R of the application is determined by the sum of all the recommendation values R of the corresponding contents c1.

Then, as the process of Step 3, the controller 10 compares the determined recommendation values R with the recommendation values R previously determined and listed in the data holder 19, and updates the list, for example, by overwriting the value if changed.

Subsequently, as the process of Step S4, the controller 10 determines whether a predetermined time period has passed by the information from the clock 18, and if the predetermined time period has passed, the controller 10 returns to Step S1.

[Flowchart related to Periodical Recommendation Calculation Taking into Account Display Level Switching]

Figure 20:
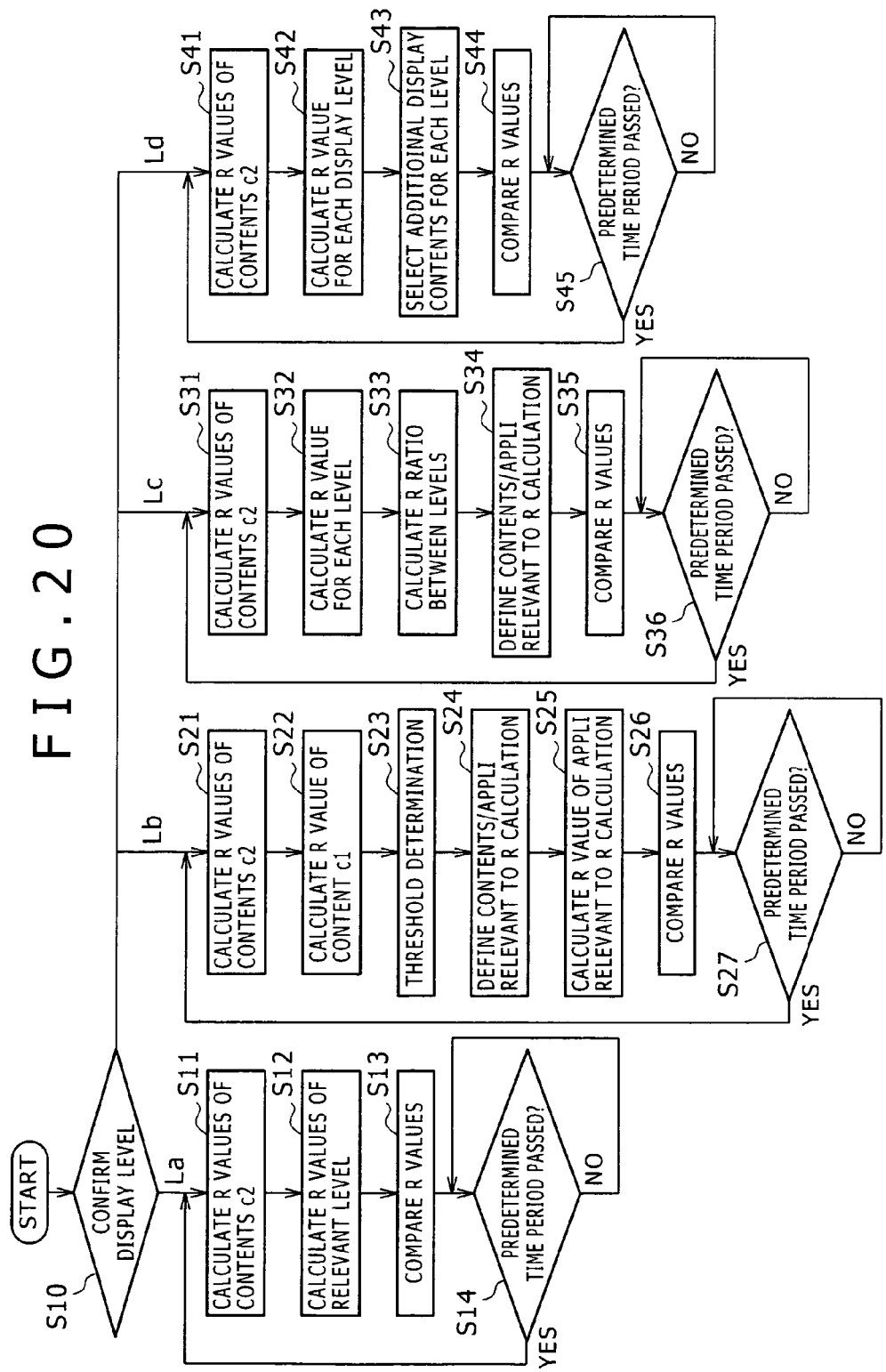
FIG. 20 is a flowchart showing the flow of a calculation process of the recommendation value carried out at predetermined time intervals in response to a display level switching.

FIG. 20 shows the flow of a calculation process of the recommendation value R carried out at a predetermined time intervals in accordance with the display level switching.

In FIG. 20, the controller 10 of the mobile phone terminal of the embodiment confirms the current display level as the process of Step S10.

Here, with the display level of the application hierarchy or the display level of the content c1 or content c2 hierarchy rather than the display level of the application hierarchy (La), the controller 10 proceeds to Step S11. For example, when the display is carried out at the display level of any hierarchy because the recommendation value R simply exceeds a certain value (Lb), the controller 10 proceeds to Step S21. For example, at the display level determined across the application hierarchy, the content c1 hierarchy, and the content c2 hierarchy, when the recommendation value R of the upper hierarchy and the recommendation value R of the lower hierarchy are identical to each other, or when the proportion of the recommendation value R of the lower hierarchy to the recommendation value R of the upper hierarchy exceeds a certain ratio (Lc), the controller 10 proceeds to Step S31. Further, when the display is carried out at the display level of the application hierarchy or of the content c1 hierarchy, along with the additional contents (Ld), the controller 10 proceeds to Step S41. Incidentally, in the flow of Ld, the user can select and set two different display levels.

Proceeding from Step S10 to Step S11, the controller 10 calculates the recommendation values R of a contents c2, and then, as the process of Step S12, calculates the recommendation value R of the relevant display level.

Then, as the process of Step S13, the controller 10 compares the determined recommendation values P with the recommendation values R previously determined and listed in the data holder 19, and updates the list, for example, by overwriting the value if changed.

Subsequently, as the process of Step S14, the controller 10 determines whether a predetermined time period has passed by the time information from the clock 18, and if the predetermined time period has passed, the controller 10 returns to Step S11.

Proceeding from Step S10 to Step S21, the controller 10 calculates the recommendation values R of contents c2, and then, as the process of Step S22, calculates the recommendation value R of a content c1 by the sum of all the recommendation values R of the contents c2.

Next, as the process of Step S23, the controller 10 makes the threshold determination by comparing the sizes of a predetermined threshold Th2 and the recommendation value R of the contents c2, and makes the threshold determination by comparing the sizes of a predetermined threshold Th1 and the recommendation value R of the contents c1. When the recommendation value R of the contents c2 is larger than the predetermined threshold Th2, the controller 10 sets the display level to the hierarchy level of the contents c2. When the recommendation value R of the contents c1 is larger than the predetermined threshold Th1, the controller 10 sets the display level to the hierarchy level of the contents c1, and sets the display level to the hierarchy level of the application in the other cases.

Then, as the process of Step S24, the controller 10 defines the actual display level, in other words, the display level of the content c1 hierarchy, content c2 hierarchy, or application hierarchy, based on the threshold determination results of Step S23.

Next, as the process of Step S25, the controller 10 calculates the recommendation value R of each application from the previously determined recommendation values R of the contents c1, c2 corresponding to each application. However, there is an exception when the basis of comparison is made identical as described below.

Incidentally, with nothing to be displayed at the display level of the application hierarchy, controller 10 skips the above Steps S24 and S25.

Here, when it is determined to carry out the display at the display level of the content c1 hierarchy, for example, the application the contents c1 belonging to may be excluded or not excluded from the display target. Further, when it is determined to carry out the display at the display level of the content c1 hierarchy (the same of the content c2), for example, the basis of comparison varies when the recommendation value R is calculated at the application hierarchy level, so that the basis of comparison can also be made identical by adding the recommendation values R of the other contents c1 of the same application to the recommendation value R to be displayed at the content c1 hierarchy level, and by calculating the recommendation value R at the application hierarchy level. These are the same as in the process (Lc) of Step S31 and subsequent steps that will be described below.

Next, as the process of Step S26, the controller 10 compares the determined recommendation values R with the recommendation values R previously determined and listed in the data holder 19, and updates the list, for example, by overwriting the value if changed.

Subsequently, as the process of Step S27, the controller 10 determines whether a predetermined time period has passed by the time information from the clock section 18, and if the predetermined time period has passed, the controller 10 returns to Step S21.

Proceeding from Step S10 to Step S31, the controller 10 calculates the recommendation values R of the contents c2.

Next, as the process of Step S32, using the recommendation value R of the content c2 hierarchy, which is determined in Step S31, the controller calculates the recommendation value of the content c1 hierarchy as well as the recommendation value R of the application hierarchy. Then, as the process of Step S33, the controller further calculates the ratio of the recommendation values R between the hierarchy levels.

Next, as the process of Step S34, the controller 10 determines the display level in the application hierarchy, the content c1 hierarchy, or the content c2 hierarchy from the results of the ratio calculation in Step S33.

Then, as the process of Step S35, the controller 10 compares the above determined recommendation values R with the recommendation values R previously determined and listed in the data holder 19, and updates the list, for example, by overwriting the value if changed.

Subsequently, as the process of Step S36, the controller 10 determines whether a predetermined time period has passed by the time information from the clock 18, and if the predetermined time period has passed, the controller 10 returns to Step S31.

Proceeding from Step S10 to Step S41, where two types of display levels, the application hierarchy and contents c1 hierarchy, are made available by the user and when either of the display levels is set by the user, the controller 10 first calculates the recommendation value R of the contents c2, and then, as the process of Step 42, calculates the recommendation value R of the display level set by the user.

Next, as the process of Step S43, the controller 10 defines the additional content display on the display level set by the user. Here, with the display level of the application hierarchy, it is possible to carry out the additional content display related to the content c1 hierarchy or the content c2 hierarchy from the user setting. Incidentally, with the display level of the content c1 hierarchy, the additional content display related to the content c2 hierarchy is carried out.

In this Step S43, the controller 10 carries out the selection of additional content display. For example, the controller 10 selects the item with the highest recommendation value R within the relevant level (content c1 hierarchy or content c2 hierarchy) of the relevant additional content display.

Incidentally, FIG. 15 shows an example of the additional content display of the content c2 hierarchy at the display level of the application hierarchy.

Then, as the process of Step S44, the controller 10 compares the determined recommendation values R with the recommendation values R previously determined and listed in the data holder 19, and updates the list, for example, by overwriting the value if changed.

Subsequently, as the process of Step S45, the controller 10 determines whether a predetermined time period has passed by the time information from the clock 18, and if the predetermined time period has passed, the controller 10 returns to Step S41.

Incidentally, although the predetermined time period has not passed in Steps S14, S27, S36, S45, for example, when a display level switch instruction is input by the user or the "specific button" is pressed, the controller 10 returns the process to the start.

Further, in the flowchart of FIG. 20, the comparison of the recommendation value R is made so that the display can be carried out in a form corresponding to the tab structure shown in FIG. 4, and its data is stored as well.

[Flowchart Related to Display]

Figure 21:
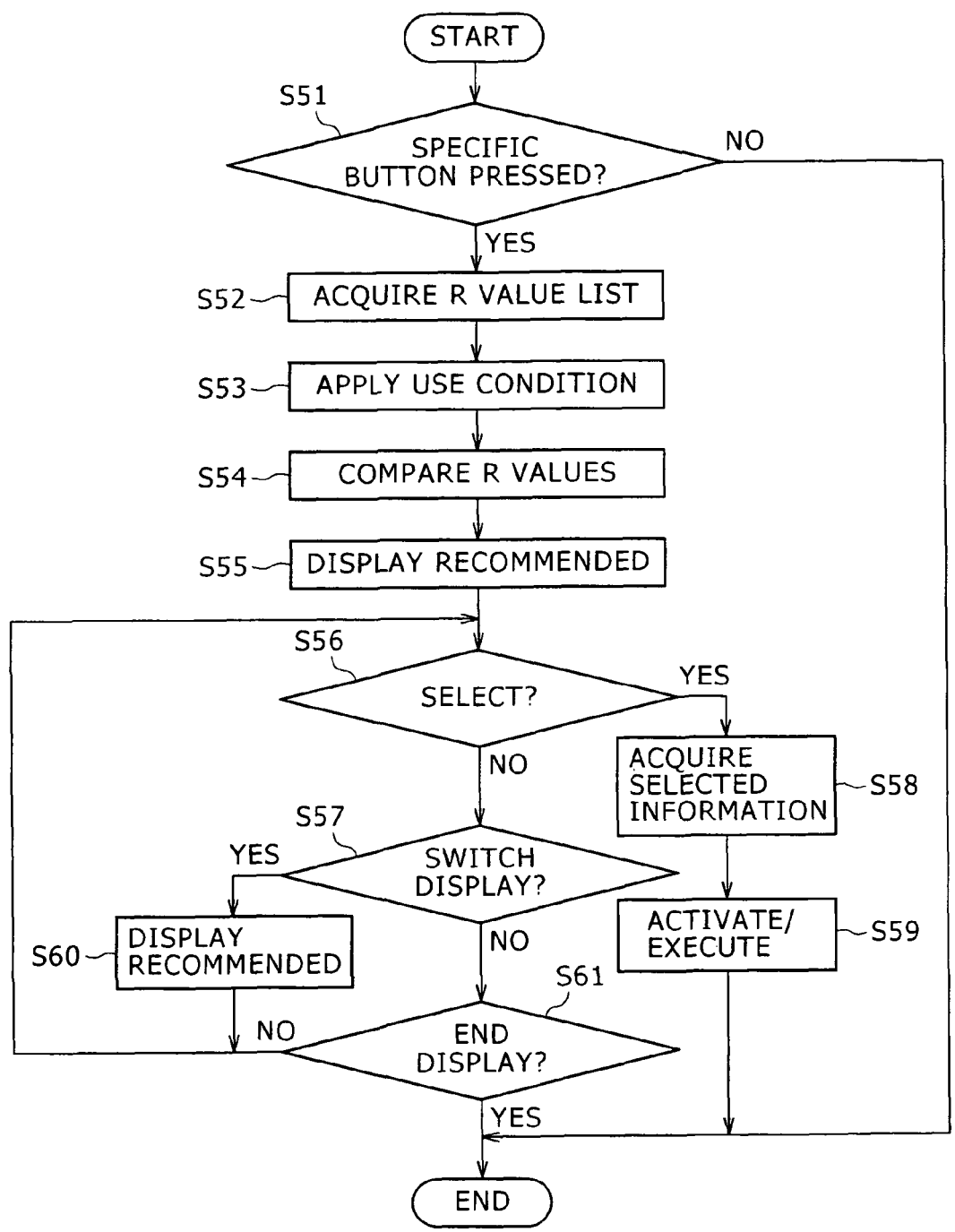
FIG. 21 is a flowchart showing the flow of a process until the applications and contents are displayed on the display, when a "specific button" is pressed.

FIG. 21 shows the flow of a process that, for example, the recommendation value R is calculated at predetermined time intervals, and the recommendations of applications and contents are defined based on the calculated recommendation values R, and subsequently when the "specific button" is pressed, the applications and contents are displayed on the display in the ranking order of the recommendations.

In FIG. 21, as the process of Step S51, the controller 10 of the mobile phone terminal of the embodiment determines whether the "specific button" is pressed by the user via the operation section 16. Upon detecting that the "specific button" is pressed, as the process of Step S52, the controller 10 acquires the list of the recommendation values R previously calculated, listed and stored in the data holder 19.

Next, as the process of Step S53, the controller 10 acquires information related to the above described application use condition categories, "Radio-Wave State Category.", "Battery level category", and "Billing State Category", from the information acquisition controller 20. Then, the controller 10 applies these application use condition categories in accordance with the predetermined setting information. In this Step S53, the controller 10 recalculates the recommendation value R based on the use condition. More specifically, the controller 10 calculates Wg*G, Wh*H, Wi*I, the results of which are applied to recalculating the recommendation value R.

Incidentally, for example, it is possible to previously calculate Wg*G, Wh*H, Wi*I. In this case, the process carried out in Step S53 is also carried out in advance. However, for examples the radio wave state is the information that timeliness is important, so that it is necessary to increase the calculation cycle when the calculation is carried out in advance as described above. On the other hand, when the calculation cycle is set in accordance with the radio wave state, the calculation cycle of other information is likely to be too fast. In order to deal with such a case, the categories can have separate calculation cycles.

Next, as the process of Step 54, the controller 10 compares the recommendation values R of the applications and contents to rank them in each of the above described tabs. Then, as the process of Step 55, the controller 10 causes the applications and contents to be displayed in the ranking order, on the display of the display section 15.

Subsequently, as the process of Step S56, the controller 10 determines whether the use of any of the applications and contents displayed on the display is selected by the user, and if none is selected, the controller 10 proceeds to Step S57, or proceeds to Step S58 if any is selected.

Proceeding to Step S57, the controller 10 determines whether the display switch instruction to select another tab is input by the user. If the display switch instruction is made, as the process of Step S50, the controller 10 causes the applications and contents to be displayed in the ranking order, in relation to the switch instructed tab.

On the other hand, when the display switch instruction is not made in Step S57 and the display end instruction is input by the user, in other words, when the input that the user does not use any application or content is made by the user, the controller 10 ends the process of the flowchart of FIG. 21.

When any of the applications and contents is selected in Step S56 and the process proceeds to Step S58, the controller 10 acquires information for updating the coefficients and category values related to the selected application or content. Then, as the process of Step S59, the controller 10 activates the selected application or executes the selected content, and then ends the process of FIG. 21.

Incidentally, the processes of the above described Steps S53 and S54 are not necessary when the restriction related to the use condition is not used. In this case, the controller 10 acquires the recommendation values R in Step S52 and carries out the display in Step S55.

Further, in the flowchart of FIG. 21, the comparison of the recommendation value R is made so that the display can be carried out in a form corresponding to the tab structure shown in FIG. 4, and its data is stored as well.

[Flowchart related to Information Acquisition]

Figure 22:
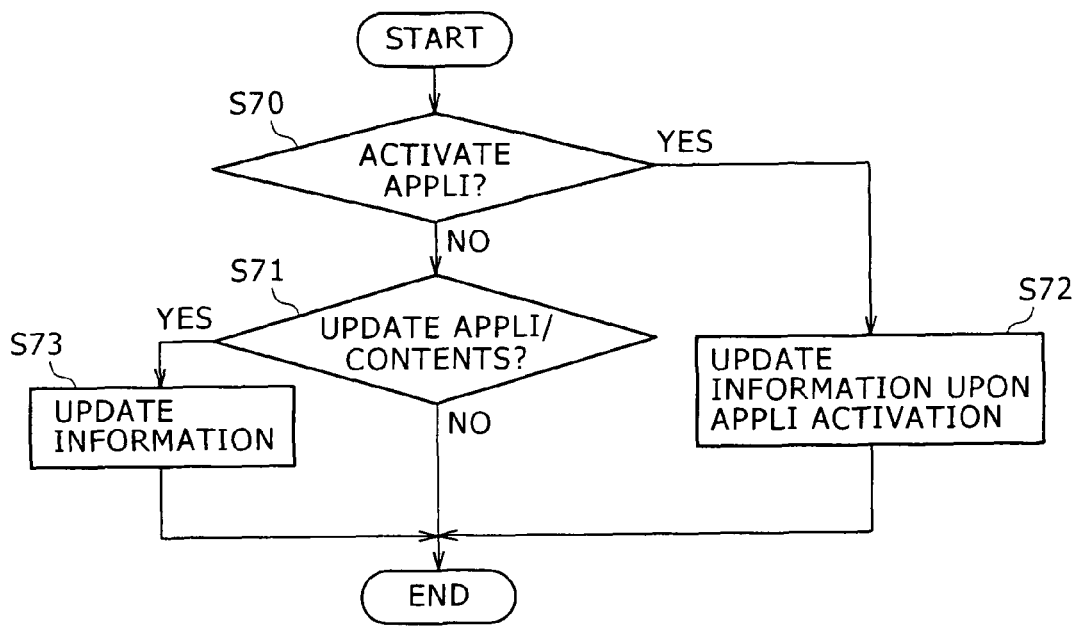
FIG. 22 is a flowchart showing the flow of an information acquisition process in an information acquisition section of the mobile phone terminal according to the embodiment.

FIG. 22 shows the flow of an information acquisition process in the information acquisition controller 20 of the mobile phone terminal of the embodiment.

In FIG. 22, as the process of Step S70, the information acquisition controller 20 of the mobile phone terminal of the embodiment determines whether any event occurs by the information from the controller 10. If the event is the application activation, the acquisition controller 20 proceeds to Step S72, while proceeding to Step S71 if the event is other than the application activation.

Proceeding to Step S72, the information acquisition controller 20, in response to the application activation, acquires various types of information and coefficients to be used in the calculation of the recommendation value R, as well as the selected information based on the instruction from the user, updates the previous information by the acquired information, and then ends the process of the flowchart of FIG. 22.

On the other hand, proceeding to Step S71, the information acquisition controller 20 determines whether the event is the update of the application and content. If the event is not the update of the application and content, the information acquisition controller 20 ends the process of the flowchart of FIG. 22, while proceeds to Step S73 if the update of the application and content.

Proceeding to Step S73, the information acquisition controller 20, in response to the update of the application and content, acquires various types of information and coefficients to be used in the calculation of the recommendation value R, updates the previous information by the acquired information, and then ends the process of the flowchart of FIG. 22. Incidentally, when a new application and content is added due to the update of the application and content, the information acquisition controller 20 generates various types of information and coefficients to be newly used in the calculation of the recommendation value R, in relation to the new application and content.

The process of the flowchart of FIG. 22 may occur after the application activation or during the execution in Step S59 of FIG. 21. For example, when the email application is activated and an email is stored in the draft folder in Step S59, it is determined as NO in Step S70 and as YES in Step S70, and the information is updated to reflect the fact that a new content c2 is generated in Step S73, as shown in FIG. 22.

[Flowchart related to Information Acquisition]

Figure 23:
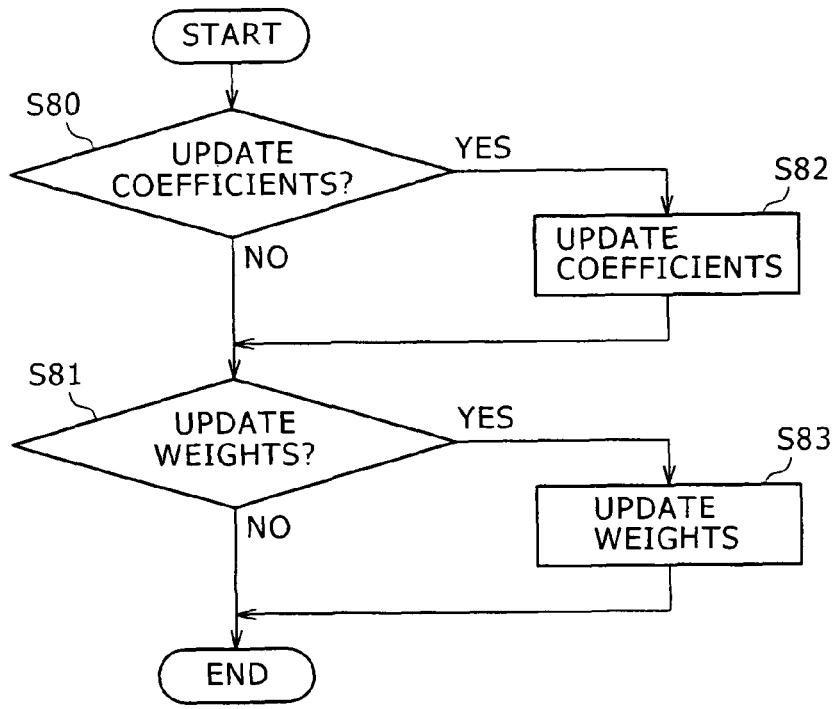
FIG. 23 is a flowchart showing the flow of an update process of the predetermined coefficients and the weighted coefficient, when the information acquisition is carried out in the information acquisition section of the mobile phone terminal according to the embodiment.

FIG. 23 shows the flow of an update process of the predetermined coefficients and weighted coefficient when information acquisition is carried out in the information acquisition controller 20 of the mobile phone terminal according to the embodiment. The process of the flowchart of FIG. 23 is a process that is activated periodically or every time due to the process of Step S72 of FIG. 22, or Step S58 of FIG. 21 as a trigger.

In this FIG. 23, when carrying out the information acquisition, the information acquisition controller 20, as the process of Step S80, determines whether to update the predetermined coefficients, real-timeness coefficient, and keyword coefficient. When determining to carry out the coefficient update, the information acquisition controller 20 proceeds to Step S82 to carry out the coefficient update correspondingly.

On the other hand, when determining not to update the predetermined coefficients, the real-timeness coefficient and the keyword coefficient in Step S80, the information acquisition controller 20 determines, as the process of Step S81, whether to update the weighted coefficient. When determining to update the weighted coefficient, the information acquisition controller 20 proceeds to Step S83 to carry out the process of the weighted coefficient update.

Incidentally, in the coefficient update process of Step S82 and the process of the weighted coefficient update of Step S83, for example, it is possible to square coefficients, carry out the coefficient update per predetermined number of application activations, and also carry out the coefficient update so as to make the relative ratio of the coefficients constant.

[Conclusion of the Description]

As described above, with the mobile phone terminal according to the embodiment of the invention, based on the basic information such as "Halfway Category", "Updated Date and Time Category", "Real-Timeness Category", "History Category", and "Frequency Category", and further based on the basic information such as "Radio-Wave/Access State Category", "Battery Level Category", and "Billing State Category", it is possible to present the applications and contents suitable for the user preference and the application use condition to a user, by determining the applications and contents to recommend the use to the user and giving them priorities to display on a display in the priority order. Particularly, according to the embodiment, it is possible to carry out recommendation to the user across a plurality of applications and contents, thus allowing the user to select an application and content more matched to the user preference among various applications and contents loaded on the mobile phone terminal.

Incidentally, the foregoing description according to each embodiment is an example of the invention. Thus, it is needless to say that the invention is not limited to the above embodiments, and that various changes may be made in accordance with a design within a scope without departing from the technical concept of the invention.

For example, although the foregoing embodiments exemplify a mobile phone terminal, the invention is also applicable to portable communication terminals such as PDAs (Persona Digital Assistants), car navigation devices, and portable TV game machines that are all equipped with a broadcast reception function and communication function.

It should be understood by those skilled in the art that various modifications, combinations, sub-combinations and alterations may occur depending on design requirements and other factors insofar as they are within the scope of the appended claims or the equivalents thereof.

What is claimed is:

1. A portable terminal comprising:
   a recommendation calculation section for calculating recommendation values indicating recommended degrees to recommend the use to a user, for each of a plurality of applications,
   wherein the recommendation calculation section places each of the applications in an upper hierarchy, calculating the recommendation values for the relevant each application and for each of the contents of the respective applications, the contents being in a lower hierarchy relative to each application, and
   wherein the recommendation calculation section further divides each of the contents of the respective applications into a plurality of hierarchies, calculating the recommendation values for each of the hierarchies of the applications and for each of the contents of each application;
   an information acquisition section for acquiring predetermined basic information that the recommendation calculation section uses for calculating the recommendation values, for each of the applications,
   wherein the information acquisition section acquires the predetermined basic information for each of the hierarchized applications and for each of the contents of the respective applications, and
   wherein the information acquisition section acquires the basic information for each of the hierarchies of the applications and for each of the contents of each application;
   a prioritization section for giving priorities to the plurality of applications based on the recommendation values the recommendation calculation section calculated,
   wherein the prioritization section gives priorities to each of the plurality of applications and to each of the contents of the respective applications, based on the recommendation values that the recommendation calculation section calculated; and
   a presentation section for presenting the applications to the user in the order of priority as defined by the prioritization section,
   wherein the presentation section presents the applications and the contents of the applications to the user, in the order of priority.

2. The portable terminal according to claim 1, wherein the information acquisition section acquires information on at least either an application or a content of the application being processed.

3. The portable terminal according to claim 2, wherein the information acquisition section acquires date and time information on when the application and content entered processed as the basic information.

4. The portable terminal according to claim 2, wherein the recommendation calculation section calculates the recommendation value, by adjusting the basic information related to at least the application with a coefficient corresponding to a type of at least either the application or the content of the application being processed.

5. The portable terminal according to claim 1, wherein the information acquisition section acquires keyword information related to a user preference as the basic information.

6. The portable terminal according to claim 5, wherein the information acquisition section acquires user basic profile information stored in advance, as the keyword information related to the user preference.

7. The portable terminal according to claim 5, wherein the information acquisition section acquires the keyword information related to the user preference from information on at least either the application or the content of the application being executed in response to a user instruction.

8. The portable terminal according to claim 1, wherein the information acquisition section acquires updated date and time information on at least either the application or the content of the application, as the basic information.

9. The portable terminal according to claim 8, wherein the recommendation calculation section calculates the recommendation value by adjusting the basic information related to at least the application with a coefficient corresponding to a type of at least either the application or the content of the application.

10. The portable terminal according to claim 1, wherein the information acquisition section acquires creation or release date and time information on at least either the application or the content of the application, as the basic information.

11. The portable terminal according to claim 1, wherein the information acquisition section acquires information related to real-timeness of at least either the application or the content of the application, as the basic information.

12. The portable terminal according to claim 1, wherein the information acquisition section acquires usage frequency or usage history information on at least either the application or the content or the application, as the basic information.

13. The portable terminal according to claim 1, further comprising:
   a wireless communications section for carrying out wireless communication; and
   a radio wave state measurement section for measuring the radio wave state of wireless communication in the wireless communications section, wherein
   the information acquisition section acquires information indicating the radio wave state that the radio wave state measurement section measured, as the basic information.

14. The portable terminal according to claim 1, wherein the information acquisition section acquires billing information associated with the use of at least either the application or the content of the application, as the basic information.

15. The portable terminal according to claim 1, further comprising a battery for generating terminal driving power, wherein
the information acquisition section acquires information on the remaining battery level as the basic information.

16. The portable terminal according to claim 1, further comprising
an information storage section for storing user schedule information, wherein
the information acquisition section acquires schedule information stored in the information storage section, as the basic information.

17. The portable terminal according to claim 1, further comprising
an operation section for fetching an operation instruction input from a user, wherein
the operation section presents a list of at least either the applications or the contents of the applications, based on an input of specific operation information from the operation instruction section.

18. The portable terminal according to claim 1, wherein
the information acquisition section acquires basic information generated for a person other than the user of the relevant terminal.

19. An information recommendation method comprising the steps of:
calculating recommendation values indicating recommended degrees to recommend the use to a user, for each of at least a plurality of applications,
wherein said calculating recommendation values places each of the applications in an upper hierarchy, calculating the recommendation values for the relevant each application and for each of the contents of the respective applications, the contents being in a lower hierarchy relative to each application, and further divides each of the contents of the respective applications into a plurality of hierarchies, calculating the recommendation values for each of the hierarchies of the applications and for each of the contents of each application;
acquiring predetermined basic information that the recommendation calculation section uses for calculating the recommendation values, for each of the applications,
wherein said acquiring predetermined basic information acquires the predetermined basic information for each of the hierarchized applications and for each of the contents of the respective applications, and acquires the basic information for each of the hierarchies of the applications and for each of the contents of each application,
giving priorities to the plurality of applications based on the recommendation values the recommendation calculation section calculated,
wherein said giving priorities gives priorities to each of the plurality of applications and to each of the contents of the respective applications, based on the recommendation values that the recommendation calculation section calculated; and
presenting the applications to the user in the order of priority as defined by the prioritization section,
wherein said presenting presents the applications and the contents of the applications to the user, in the order of priority.

20. An information recommendation computer program product comprising a computer readable medium including program code stored thereon, said program code being executable to perform operations comprising:
calculating recommendation values indicating recommended degrees to recommend the use to a user, for each of at least a plurality of applications,
wherein said calculating recommendation values places each of the applications in an upper hierarchy, calculating the recommendation values for the relevant each application and for each of the contents of the respective applications, the contents being in a lower hierarchy relative to each application, and further divides each of the contents of the respective applications into a plurality of hierarchies, calculating the recommendation values for each of the hierarchies of the applications and for each of the contents of each application;
acquiring predetermined basic information that the recommendation calculation section uses for calculating the recommendation values, for each of the applications,
wherein said acquiring predetermined basic information acquires the predetermined basic information for each of the hierarchized applications and for each of the contents of the respective applications, and acquires the basic information for each of the hierarchies of the applications and for each of the contents of each application;
giving priorities to the plurality of applications based on the recommendation values the recommendation calculation section calculated,
wherein said giving priorities gives priorities to each of the plurality of applications and to each of the contents of the respective applications, based on the recommendation values that the recommendation calculation section calculated; and
presenting the applications to the user in the order of priority as defined by the prioritization section,
wherein said presenting presents the applications and the contents of the applications to the user, in the order of priority.

* * * * *